United States Patent
Ke et al.

(10) Patent No.: US 12,185,097 B2
(45) Date of Patent: *Dec. 31, 2024

(54) METHOD OF CONTROLLING LOCATION ACQUISITION, USER TERMINAL AND DEVICE

(71) Applicant: VIVO MOBILE COMMUNICATION CO., LTD., Guangdong (CN)

(72) Inventors: Xiaowan Ke, Chang'an Dongguan (CN); Fei Qin, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 565 days.

This patent is subject to a terminal disclaimer.

(21) Appl. No.: 17/467,080

(22) Filed: Sep. 3, 2021

(65) Prior Publication Data

US 2021/0400471 A1  Dec. 23, 2021

Related U.S. Application Data

(63) Continuation of application No. 16/767,546, filed as application No. PCT/CN2018/115204 on Nov. 13, 2018, now Pat. No. 11,159,938.

(30) Foreign Application Priority Data

Nov. 27, 2017 (CN) .......................... 201711204326.6

(51) Int. Cl.
*H04W 12/02* (2009.01)
*H04W 4/029* (2018.01)

(52) U.S. Cl.
CPC ........... *H04W 12/02* (2013.01); *H04W 4/029* (2018.02)

(58) Field of Classification Search
None
See application file for complete search history.

(56) References Cited

U.S. PATENT DOCUMENTS 7,953,421 B2 * 5/2011 Duan .................... H04W 64/00
455/456.2
8,855,665 B2 * 10/2014 Buford .................... H04W 4/20
455/457

(Continued)

FOREIGN PATENT DOCUMENTS

CN  101009929 A  8/2007
CN  101155025 A  4/2008

(Continued)

OTHER PUBLICATIONS

Qualcomm Incorporated, "Location reporting using Control Plane CIOT EPS Optimisation," 3GPP Draft, S2-170513, vol. SA WG2 pp. 1-15, (Mar. 4, 2017).
EP Office Action dated Jun. 27, 2022 as received in Application No. 18 880 966.9.
Non Final Office Action dated Mar. 31, 2021 as received in U.S. Appl. No. 16/767,546.

(Continued)

*Primary Examiner* — Adolf Dsouza
(74) *Attorney, Agent, or Firm* — BROOKS KUSHMAN P.C.

(57) ABSTRACT

This application provides a method of controlling a location acquisition, a user terminal and a device, which relates to the field of communication technologies, so as to increase the flexibility of location services, and to save the overheads of a terminal and a network. The method includes: determining whether a predetermined condition is satisfied; in the case that the predetermined condition is satisfied, sending control information configured to control a relevant behavior of acquiring a location of the user terminal.

20 Claims, 8 Drawing Sheets

(56) References Cited

U.S. PATENT DOCUMENTS

| | | |
|---|---|---|
| 2004/0054598 A1 | 3/2004 | Kull et al. |
| 2005/0289095 A1 | 12/2005 | Rauhala et al. |
| 2007/0287412 A1 | 12/2007 | Ge et al. |
| 2009/0004915 A1 | 2/2009 | Ge |
| 2010/0041418 A1 | 2/2010 | Edge et al. |
| 2014/0370914 A1 | 12/2014 | Jung et al. |

FOREIGN PATENT DOCUMENTS

| | | |
|---|---|---|
| CN | 103596172 A | 2/2014 |
| CN | 103974416 A | 8/2014 |
| WO | 2016196806 A1 | 12/2016 |

OTHER PUBLICATIONS

Written Opinion and International Search Report dated Jun. 11, 2020 as received in application No. PCT/CN2018/115204.

European Search Report dated Nov. 13, 2020 as received in application No. 18880966.9.

Change Request 3GPP TSG SA WG2 Meeting #38, Tdoc, S2-041061, Feb. 16, 2004. SA2.

Bouchard, "Choose when Low Power Mode Automatically Toggles On or Off with Low Power Modder", Feb. 2017.

Chinese Office Action dated Jan. 15, 2020 as received in application No. 201711204326.6.

* cited by examiner

METHOD OF CONTROLLING LOCATION ACQUISITION, USER TERMINAL AND DEVICE

CROSS REFERENCE OF RELATED APPLICATION

This application is a continuation application of U.S. application Ser. No. 16/767,546, filed May 27, 2020, which is a U.S. national phase application of a PCT Application No. PCT/CN2018/115204 filed on Nov. 13, 2018, which claims a priority to Chinese Patent Application No. 201711204326.6 filed on Nov. 27, 2017, the disclosures of which are incorporated in their entirety by reference herein.

TECHNICAL FIELD

The present disclosure relates to the field of communication technologies, and in particular to a method of controlling a location acquisition, a user terminal and a device.

BACKGROUND

In the location service in the related art, the network actively requests the user terminal to report the location of the user terminal. For example, the network requires the user terminal to perform a location measurement and report the location according to the request of the location service client. However, in actual applications, the user of the user terminal does not necessarily want to report its location, so the user terminal may not respond to the request sent by the network, which results in a waste of transmission resources occupied by signaling and consumes power consumption of the user terminal. It can be seen that the location service in the related art, the transmission resource is wasted and the power consumption is large.

SUMMARY

In a first aspect, a method of controlling a location acquisition is provided in an embodiment of the present disclosure, applied to a user terminal, including:

determining whether a predetermined condition is satisfied:

in the case that the predetermined condition is satisfied, sending control information configured to control a relevant behavior of acquiring a location of the user terminal.

In a second aspect, a method of controlling a location acquisition is further provided in an embodiment of the present disclosure, applied to a network unit or a location service client, including:

receiving control information configured to control a relevant behavior of acquiring a location of a user terminal:

controlling, based on or referring to the control information, the relevant behavior of acquiring the location of the user terminal.

In a third aspect, a user terminal is further provided in an embodiment of the present disclosure, including:

a determining module, configured to determine whether a predetermined condition is satisfied:

a sending module, configured to, in the case that the predetermined condition is satisfied, send control information configured to control a relevant behavior of acquiring a location of the user terminal.

In a fourth aspect, a device of controlling a location acquisition is further provided in an embodiment of the present disclosure, applied to a network unit or a location service client, including:

a receiving module, configured to receive control information configured to control a relevant behavior of acquiring a location of a user terminal:

a controlling module, configured to control, based on or referring to the control information, the relevant behavior of acquiring the location of the user terminal.

In a fifth aspect, a user terminal is further provided in an embodiment of the present disclosure, including: a memory, a processor and a computer program stored in the memory and executable on the processor, where the computer program is executed by the processor to perform the method of controlling a location acquisition at the user terminal side in the embodiment of the present disclosure.

In a sixth aspect, a device of controlling a location acquisition is further provided in an embodiment of the present disclosure, including: a memory, a processor and a computer program stored in the memory and executable on the processor, where the computer program is executed by the processor to perform the method of controlling a location acquisition at the device of controlling a location acquisition side in the embodiment of the present disclosure.

In a seventh aspect, a computer-readable storage medium storing a computer program is further provided in an embodiment of the present disclosure, where the computer program is executed by a processor to perform the method of controlling a location acquisition at the user terminal side in the embodiment of the present disclosure.

In an eighth aspect, a computer-readable storage medium storing a computer program is further provided in an embodiment of the present disclosure, where the computer program is executed by a processor to perform the method of controlling a location acquisition at the device of controlling a location acquisition side in the embodiment of the present disclosure.

BRIEF DESCRIPTION OF THE DRAWINGS

In order to more clearly explain the technical solutions of the embodiments of the present disclosure, the drawings required for the description of the embodiments of the present disclosure will be briefly described below. Obviously, the drawings in the following description are only some embodiments of the present disclosure. For those of ordinary skill in the art, without any creative work, other drawings may also be acquired based on these drawings.

DETAILED DESCRIPTION

The technical solutions in the embodiments of the present disclosure will be described clearly and completely in conjunction with the drawings in the embodiments of the present disclosure. Obviously, the described embodiments are part of the embodiments of the present disclosure, but not all of the embodiments. Based on the embodiments of the present disclosure, all other embodiments acquired by a person of ordinary skill in the art without creative work fall within the scope of the present disclosure.

Figure 1:
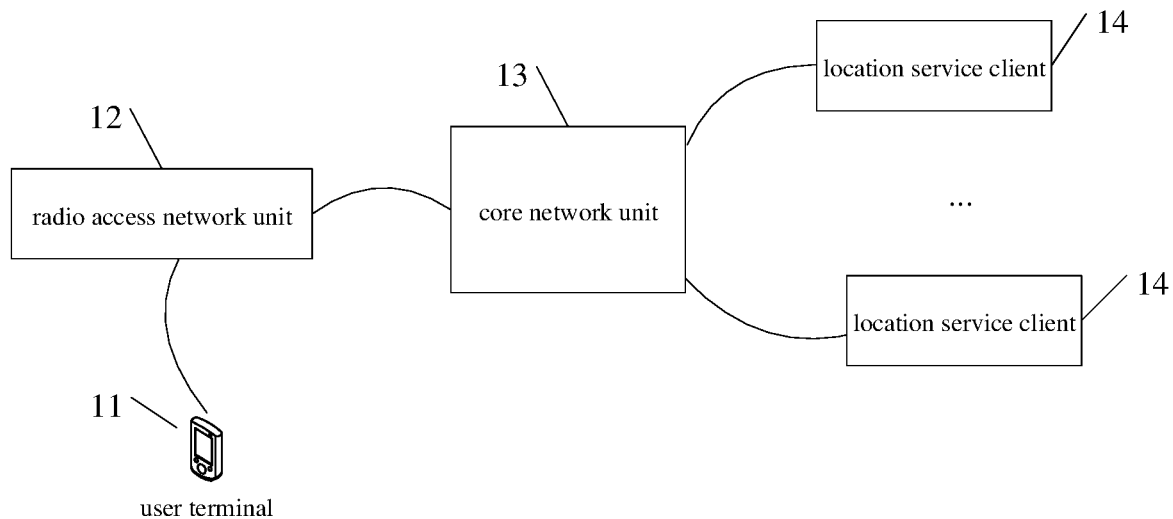
FIG. 1 is a structural diagram of a system of controlling a location acquisition in an embodiment of the present disclosure.

Referring to FIG. 1 which is a structural diagram of a system of controlling a location acquisition in an embodiment of the present disclosure. As shown in FIG. 1, the system includes a user terminal 11, a radio access network unit 12, a core network unit 13 and at least one location service client 14. The user terminal 11 may be a User Equipment (UE), for example, a mobile phone, a Tablet Personal Computer, a Laptop Computer, a personal digital assistant (PDA), a Mobile Internet Device (MID) or a Wearable Device and other terminal-side devices. It should be noted that the specific type of the user terminal 11 is not limited in the embodiment of the present disclosure. The radio access network unit 12 may be a radio access network node and/or a radio access network function. The radio access network unit may include but is not limited to at least one of: an evolved Node B (eNB), a next-generation Base station (gNB), a Centralized Unit (CU), a Distributed Unit (DU), a Centralized Unit Control Plane (CU-CP), a Centralized Unit User Plane (CU-UP). It should be noted that the specific type of the radio access network unit 12 is not limited in the embodiment of the present disclosure. The user terminal 11 may communicate with the core network unit 13 through the radio access network unit 12, where the core network unit 13 may be a core network node and/or a core network function, and the core network unit may include but is not limited to at least one of: a mobile management node, a mobile management function, a location service management node, a location service management function, a user data management node, a user data management function, an Access and Mobility Management Function (AMF), a Mobile Management Entity (MME), a Location Services (LCS), an Enhanced Service Serving Mobile Location Centre (E-SMLC). In addition, the location service client 14 may send a location acquiring request to the core network unit 13, and the core network unit 13 may respond to or reject the location acquiring request. In addition, the location service client 14 may be called an LCS client, and may be a third-party device, such as a third-party device such as a commercial third-party device or an emergency third-party device (such as a public security bureau) device.

The specific functions of the user terminal 11, the radio access network unit 12, the core network unit point 13, and the location service client 14 will be described in detail through the following embodiments.

In addition, it should be noted that the control information in the present disclosure may be referred to as one of the following information:

Control information about acquiring the location of the user terminal;

Control information for controlling the relevant behavior of acquiring the location of the user terminal.

In some embodiments, the control information described herein may also be understood as the user terminal and/or the user's propensity information regarding the acquisition of the user terminal's relevant behavior or may be understood as the user and/or user terminal's propensity information regarding the acquisition of the user terminal's location.

In addition, it should be noted that "permitted" in the present disclosure may also be referred to as enabling. The "non-permitted" appearing in the present disclosure can also be called one of the following: disable, prohibit.

In addition, in the embodiment of the present disclosure, the information of the interaction between the user terminal and the core network unit may be forwarded or transparently transmitted through the radio access network.

Optionally, the user terminal may send to the core network unit through a Radio Resource Control (RRC) message or a non-access stratum (NAS) message.

The user terminal may send to the core network unit through the following but not limited to the following messages:

Registration request (such as Registration request, Attach Request), registration completed (such as Registration Complete, Attach Complete), location update request message (such as Registration request, TAU Request), location update completed (such as Registration Complete, TAU Complete), location request permits verification. In response, control information about UE location acquisition is sent to the mobility management node/function. The NAS messages are transparently transmitted through the radio access network unit.

The RRC message is sent through the radio access network unit, and then the radio access network unit forwards it to the management node/function (such as AMF, MME) through the S1 or NG interface message.

The mobile management node/function (such as AMF, MME) can send control information about the location acquisition of the UE to the location service management node/function (such as E-SMLC, LCS).

The core network unit may contain multiple network nodes or network functions (mobile management nodes/functions, location service management nodes/functions, user data management nodes/functions, etc.). In the embodiments of the present disclosure, operations between network nodes or network functions in the core network unit are not limited.

After receiving the location request sent by the location service client, the location service management unit can generate a location request about the user terminal and send it to the mobile management unit. The mobile management unit sends the result of acquiring the location of the user terminal to the location service management unit. The interoperable location between the unit and the mobility management unit is not limited in the embodiment.

In addition, the network units herein may represent network entities and/or network functions. The core network unit may represent core network entities and/or core network functions. The radio access network node may represent a radio access network entity and/or a radio access network function. The mobility management unit may represent a mobility management entity/mobility management unit. The location service management unit may represent the location service management entity/location service management unit.

In addition, the present disclosure mentions that the verifying request or verification process for acquiring the location of the user terminal may be a request for the user terminal to confirm whether it is permitted to acquire the location of the user terminal. For example, it may be a verifying request regarding privacy permission for acquiring the location of the user terminal, or a verifying request based on whether the user terminal itself tends to permit an acquisition of the location of the user terminal.

In some embodiments, the "subsequent" herein, at the user terminal side, refers to after sending the control information by the user terminal. In other embodiments, the "subsequent", at the network unit side, refers to after receiving the control information by the network unit side.

Figure 2:
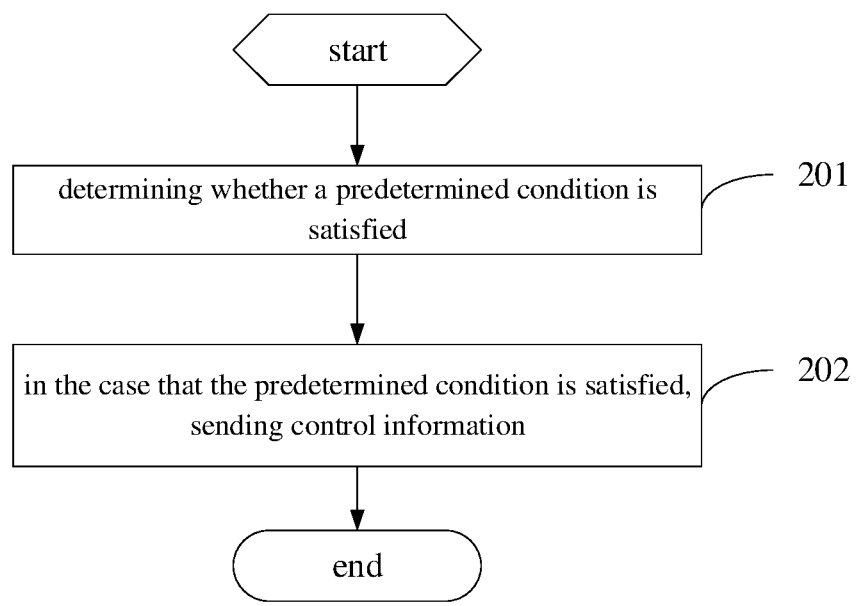
FIG. 2 is a flowchart of a method of controlling a location acquisition in an embodiment of the present disclosure.

Referring to FIG. 2 which is a flowchart of a method of controlling a location acquisition in an embodiment of the present disclosure. As shown in FIG. 2, the method includes the following steps:

Step 201: determining whether a predetermined condition is satisfied.

The above predetermined conditions may be pre-configured by the user terminal, or pre-set by the user, or pre-defined by the protocol, or pre-configured by the network to the user terminal, and so on. For example, the above predetermined condition may be receiving a specific instruction input by a user, or a specific request sent by a network, etc., which is not limited in this embodiment of the present disclosure.

Step 202: in the case that the predetermined condition is satisfied, sending control information configured to control a relevant behavior of acquiring a location of the user terminal.

The control information sent above may be generated and/or updated according to the operation input by the user.

For example, if the user wants to protect location privacy, the control information may be generated and configured to not permit the relevant behavior of acquiring the location of the user terminal. Later, if the user wants to disclose the location of the user terminal, the control information may be updated to permit to acquire and/or permit to disclose the location of the user terminal to a third party, vice versa. Alternatively, the above control information may be generated intelligently by the user terminal.

For example, when the power of the user terminal is relatively low (for example, when in the power saving mode) or when the measurement overhead is too large to affect other services of the UE, the control information may be generated and configured to not permit the relevant behavior of acquiring the location of the user terminal. When the subsequent user terminal has sufficient power or is idle, the control information may be updated to permit acquisition of the user terminal location and/or permit to disclose the user terminal location to a third party, vice versa. This embodiment of the present disclosure is not limited herein.

Alternatively, the control information sent above may also be control information sent by the user terminal according to the received request message.

For example, when the network side sends multiple requests for acquiring the location of the user terminal and/or sends a verifying request for acquiring the location of the user terminal, the user or the user terminal does not intend to be acquired for the location of the user terminal for a period of time, Then, the control information may be generated and sent so that the network side no longer sends a location request to the user terminal and/or sends a verifying request to acquire the location of the user terminal within a period of time. After the time limit expires, the network may send a request to the user terminal to acquire the location of the user terminal and/or send a verifying request to acquire the location of the user terminal. Alternatively, if the user or the user terminal does not intend to acquire the location of the user terminal for a period of time, the control information may be generated and sent. On the one hand, the request of acquiring the location of the user terminal and/or the verifying request of acquiring the location of the user terminal may be friendly permitted; but it is required that the network side no longer send a location request to the user terminal and/or send a verifying request for acquiring the location of the user terminal in a subsequent period of time. After the time limit expires, the network may send a request to the user terminal to acquire the location of the user terminal and/or send a verifying request to acquire the location of the user terminal.

For example, receiving the request of acquiring the control information and returning the control information. For example, receiving the control information request indicating returning back the control information when the control information is updated. Then, when the control information is updated, the control information is returned.

In addition, the above-mentioned control information configured to control the relevant behavior of acquiring the location of the user terminal may be that the control information may control the relevant behavior of acquiring the location of the user terminal, where the relevant behavior of acquiring the location of the user terminal may be a behavior related to acquiring the location of the user terminal, including but not limited to at least one of: acquiring the location of the user terminal, disclosing the location of the user terminal (such as sending the acquired location of the user terminal to a location service client), triggering the user terminal to perform the location measurement and responds to a location acquiring request sent by a location service client. For example, the above control information may be that the acquiring of the location of the user terminal is permitted, or the acquiring of the location of the user terminal is not permitted, or the disclosing of the location of the user terminal is permitted, or the disclosing of the location of the user terminal is not permitted, and so on.

The sending the control information may be sending the control information to the network side, including but not limited to sending control information to the network unit and/or location service client. The way that the user terminal sends the control information to the location service client is that it can be transparently transmitted or forwarded to the location service client through the network unit. After receiving the above control information, the network unit and/or location service client may control the relevant behavior of acquiring the location of the user terminal according to or referring to the control information, for example: acquiring the location of the user terminal, or not permitting to acquire the location of the user terminal, or disclosing the location of the user terminal, or not permitting to disclose the location of the user terminal, and so on.

In addition, the above control information may be applied to all location service clients or a part of location service clients, for example: the user terminal and the network unit pre-negotiate the location service client to which the above control information is applicable, or the protocol predefines the location service client to which the above control information is applicable. The location requests such as public security bureaus or schools to serve clients' urgent business needs can always be permitted, not limited by the control information.

Through the above steps, the user terminal may control the relevant behavior of acquiring the location of the user terminal, which can reduce some meaningless signaling overhead to save transmission resources, and can also reduce the power consumption and location measurement overhead of the user terminal.

It should be noted that the above method provided in the embodiment of the present disclosure can be applied to a 5G system, but it is not limited to this, as long as it can achieve basically the same function and is suitable for other communication systems, for example: 6G system or other communication systems applying the location services, etc.

In this embodiment, control information for controlling the relevant behavior of acquiring the location of the user terminal is sent. Thereby, some meaningless signaling overhead can be reduced to save transmission resources, and the power consumption of the user terminal can also be reduced.

Figure 3:
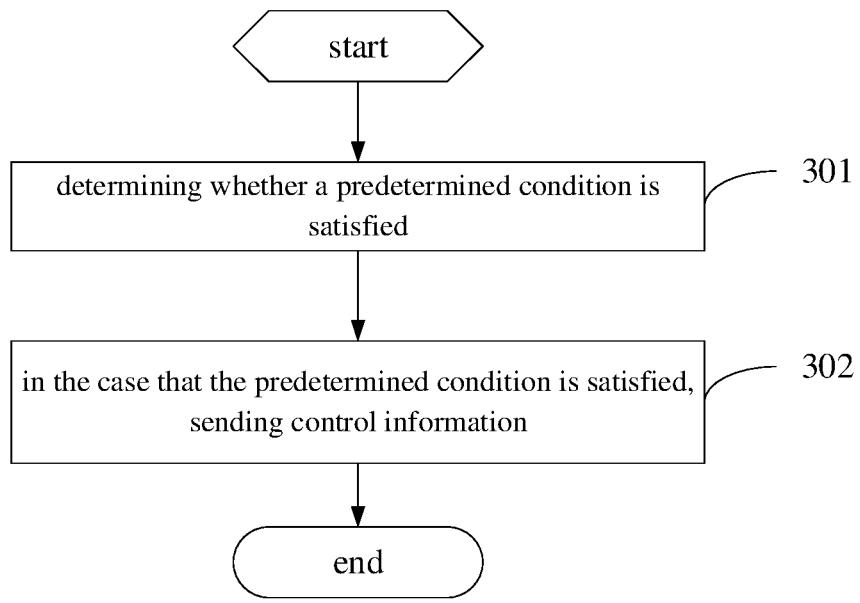
FIG. 3 is a flowchart of a method of controlling a location acquisition in another embodiment of the present disclosure.

Referring to FIG. 3 which is a flowchart of a method of controlling a location acquisition in another embodiment of the present disclosure. As shown in FIG. 3, the method includes the following steps:

Step 301: determining whether a predetermined condition is satisfied;

The predetermined condition may include but not limited to at least one of:

generating and/or updating the control information;

an acquiring request of acquiring the location of the user terminal is received;

a verifying request of acquiring the location of the user terminal is received;

a request of acquiring current control information is received; and a request of acquiring updated control information in the case that the current control information changes is received.

For the above-mentioned generating and/or updating of the control information, reference may be made to the embodiment shown in FIG. 2, which will not be repeated here.

The above acquiring request of acquiring the location of the user terminal may be a network unit or a location service client requesting the user terminal for acquiring the location of the user terminal; the verifying request of acquiring the location of the user terminal may be a request for the user terminal to confirm whether acquisition of the location of the user terminal is permitted; the above request of acquiring the current control information may be a request for the user terminal to acquire control information for controlling the relevant behavior of acquiring the location of the user terminal; the request of acquiring the updated control information may be a request for the user terminal to acquire updated control information.

Through the above-mentioned predetermined conditions, the user terminal may only send control information under certain circumstances, which can increase the flexibility of location services, and can also save the user terminal and network overhead, because the above-mentioned predetermined conditions can avoid the overhead waste caused by the user terminal sending the control information when the network units or location service clients do not need the location service.

Step 302: in the case that the predetermined condition is satisfied, sending control information configured to control a relevant behavior of acquiring a location of the user terminal.

Optionally, the control information indicates at least one of:

whether to permit to perform the relevant behavior of acquiring the location of the user terminal;

whether to permit a currently requested relevant behavior of acquiring the location of the user terminal;

whether to permit a subsequent relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; and a non-permission condition for not permitting to disclose the acquired location of the user terminal.

The permission condition for permitting the relevant behavior of acquiring the location of the user terminal may refer to that when the permission condition is satisfied, the relevant behavior of acquiring the location of the user terminal may be permitted, and/or when the permission condition is not satisfied, the relevant behavior of acquiring the location of the user terminal may not be permitted.

The non-permission condition for not permitting the relevant behavior of acquiring the location of the user terminal may refer to that when the non-permission condition is satisfied, the relevant behavior of acquiring the location of the user terminal may not be permitted, and/or when the non-permission condition is not satisfied, the relevant behavior of acquiring the location of the user terminal may be permitted.

The permission condition for permitting the subsequent relevant behavior of acquiring the location of the user terminal may refer to that when the permission condition is satisfied, the subsequent relevant behavior of acquiring the location of the user terminal may be permitted, and/or when the permission condition is not satisfied, the subsequent relevant behavior of acquiring the location of the user terminal may not be permitted.

The non-permission condition for not permitting the subsequent relevant behavior of acquiring the location of the user terminal may refer to that when the non-permission condition is satisfied, the subsequent relevant behavior of acquiring the location of the user terminal may not be permitted, and/or when the non-permission condition is not satisfied, the subsequent relevant behavior of acquiring the location of the user terminal may be permitted.

The permission condition for permitting to disclose the acquired location of the user terminal may refer to that when the permission condition is satisfied, the location of the acquired user terminal may be permitted to be disclosed and/or when the permission condition is not satisfied, the location of the acquired user terminal may not be permitted to be disclosed.

The non-permission condition for not permitting to disclose the acquired location of the user terminal may refer to that when the non-permission condition is satisfied, the location of the acquired user terminal may not be permitted to be disclosed and/or when the non-permission condition is not satisfied, the location of the acquired user terminal may be permitted to be disclosed.

In this embodiment, it may be realized that the above control information may indicate whether to permit the relevant behavior of acquiring the location of the user terminal, for example: the above control instruction permits the relevant behavior of acquiring the location of the user terminal, or not permits the relevant behavior of acquiring the location of the user terminal.

In another embodiment, the above control information may indicate whether to permit the relevant behavior of acquiring the location of the user terminal from the network request this time, and whether to permit the subsequent relevant behavior of acquiring the location of the user terminal. The above-mentioned relevant behavior of acquiring the location of the user terminal from the network request may be a recent or current relevant behavior of the network to acquire the location of the user terminal for the user terminal, for example: acquiring the location of the user terminal or requesting the user terminal to perform permission verification on the location request, or trigger the user terminal to perform the location measurement, and so on. The above control information may indicate whether to permit the current and whether to permit the subsequent relevant behavior of acquiring the location of the user terminal, thereby saving signaling overhead.

For example, the network initiates a verifying request to the user terminal to acquire the location of the user terminal, and the user terminal returns the above control information to the network verification response. According to the above control information, the network determines whether to acquire the location information of the user terminal and/or how to acquire the location information of the user terminal, and whether to disclose the location information of the user terminal to the location service client. The above control information may indicate at least one of:

whether to permit the currently requested relevant behavior of acquiring the location of the UE;

whether to permit the subsequent relevant behavior of acquiring the location of the UE;

a non-permission time duration of not permitting the subsequent relevant behavior of acquiring the location of the user terminal.

The non-permission time duration of not permitting the subsequent relevant behavior of acquiring the location of the user terminal may refer to that it is required to wait for a period of time before permitting subsequent relevant behaviors regarding acquiring the location of the UE or may refer to not permitting subsequent relevant behaviors regarding acquiring the location of the UE.

In one embodiment, the user terminal may permit the current location request about the user terminal, and temporarily not permit subsequent location requests about the user terminal. This can be achieved by setting a length of time that permits subsequent location requests for user terminals, and a length of time that does not permit subsequent location requests for user terminals. After receiving the waiting time or the non-permitted time duration, the network unit may perform the relevant behavior of acquiring the location of the user terminal within the waiting time or the non-permitted time, as described above, which will not be repeated here. After the non-permitted time or the wait time expires, if a service request for the user terminal location is received, the network node/function may ask the user terminal whether to permit to acquire and/or disclose location information about the user terminal.

As such, the current situation (energy or overhead) of the user terminal may not support the frequent location measurement. In a friendly manner, this location request for the user terminal may be permitted this time, but the subsequent location requests are delayed.

In addition, the above control information may indicate the permission range and the non-permission range implicitly by indicating the permission condition and the non-permission condition described above, thereby saving signaling overhead.

In an embodiment, the control information indicates permitting the relevant behavior of acquiring the location of the user terminal; and/or the control information indicates permitting the subsequent relevant behavior of acquiring the location of the user terminal; and/or the control information indicates a permission range where permitting the relevant behavior of acquiring the location of the user terminal; and/or the control information indicates a permission range where permitting the subsequent relevant behavior of acquiring the location of the user terminal.

The above control information only indicating permitting the relevant behavior of acquiring the location of the user terminal can be understood as not limiting the permission range, and the above control information only indicating permitting the subsequent relevant behavior of acquiring the location of the user terminal can also be understood as not limiting the permission range.

The above control information indicating a permission range where permitting the relevant behavior of acquiring the location of the user terminal can be understood as that the relevant behavior of acquiring the location of the user terminal is permitted within the permission range, and the relevant behavior of acquiring the location of the user terminal is not permitted outside the permission range.

The above control information indicating a permission range where permitting the subsequent relevant behavior of acquiring the location of the user terminal can be understood as that the subsequent relevant behavior of acquiring the location of the user terminal is permitted within the permission range, and the subsequent relevant behavior of acquiring the location of the user terminal is not permitted outside the permission range.

In another embodiment, the control information indicates not permitting to acquire the location of the user terminal; and/or the control information indicates a non-permission range where not permitting to acquire the location of the user terminal; and/or the control information indicates not permitting to acquire the location of the user terminal subsequently; and/or the control information indicates a non-permission range where not permitting to acquire the location of the user terminal subsequently.

The control information indicating not permitting the relevant behavior of acquiring the location of the user terminal may be not limiting the non-permission range, and the above control information indicating not permitting the subsequent relevant behavior of acquiring the location of the user terminal may be not limiting the non-permission range.

The above control information indicating a non-permission range where not permitting the relevant behavior of acquiring the location of the user terminal can be understood as that the relevant behavior of acquiring the location of the user terminal is not permitted within the non-permission range, and the relevant behavior of acquiring the location of the user terminal is permitted outside the non-permission range.

The above control information indicating a non-permission range where not permitting the subsequent relevant behavior of acquiring the location of the user terminal can be understood as that the subsequent relevant behavior of acquiring the location of the user terminal is not permitted within the non-permission range, and the subsequent relevant behavior of acquiring the location of the user terminal is permitted outside the non-permission range.

In another embodiment, the control information further indicates at least one of:

whether to permit to disclose the acquired location of the user terminal; and/or a permission range where permitting to disclose the acquired location of the user terminal; and/or a non-permission range where not permitting to disclose the acquired location of the user terminal.

The above whether to permit to disclose the acquired location of the user terminal may be a behavior result of whether to permit to disclose the acquired location of the user terminal to a third party, for example, whether to permit to disclose the acquired location of the user terminal to a location service client.

The above permission range where permitting to disclose the acquired location of the user terminal may be permitting to disclose the acquired location of the user terminal within the permission range, for example, permitting to disclose the acquired location of the user terminal within the permission range.

The above non-permission range where not permitting to disclose the acquired location of the user terminal may be not permitting to disclose the acquired location of the user terminal within the non-permission range, for example, not permitting to disclose the acquired location of the user terminal within the non-permission range.

In this embodiment, it is able to flexible control whether the location of the user terminal is disclosed, thereby improving the privacy protection performance.

Optionally, the control information indicates the permission range by including a permission condition and/or a non-permission condition; where the range that meets the permission condition belongs to the permission range and/or the range that does not meet the non-permission condition belongs to the permission range.

Optionally, the control information indicates the non-permission range by including a permission condition and/or a non-permission condition; where the range that does not meet the permission condition belongs to the non-permission range and/or the range that meets the non-permission condition belongs to the non-permission range.

In this embodiment, it is able to indicate the permission range through the permission condition and/or the non-permission condition. For example, the range corresponding to the permission condition is the permission range, and the range outside the range corresponding to the non-permission condition is the permission range. In addition, it is able to indicate the non-permission range through the permission condition and/or the non-permission condition. For example, the range outside the range corresponding to the permission condition is the non-permission range, and the range corresponding to the non-permission condition is the permission range.

In this embodiment, it is also possible to realize that the permission operations are performed in conjunction with the non-permission operations. In addition, when the user terminal is changed from non-permission to permission, the control information of the user terminal can be updated to the network. Since the network does not need to request the user terminal to verify each location request, the network does not need to frequently request the user terminal to perform authorization verification on each location request. The network can directly request the user terminal to perform the location measurement, thereby saving the signaling interaction process required for verifying the location request and saving user terminal and network overhead.

Optionally, the permission condition includes at least one of: a permitted time period, a permitted time duration, permitted location service client information, permitted usage information, permitted terminal status information, permitted location type information, permitted moving area range information and permitted location measurement technical information; and/or the non-permission condition includes at least one of: a non-permitted time period, a non-permitted time duration, non-permitted location service client information, non-permitted usage information, non-permitted terminal status information, non-permitted location type information, non-permitted moving area range information and non-permitted location measurement technical information.

In the above embodiment, it is able to achieve a more controllable location service through the time period or time duration. The time period may refer to being valid within a specific time interval, and the time duration may refer to that the network unit starts a timer after receiving the time duration, and the timer is valid according to the time duration. In this way, by setting the permitted time period, the permitted time duration, the non-permitted time period and/or the non-permitted time duration, etc., it is able to reduce the signaling of the interaction between the network and the user terminal and the cost of the user terminal within a period of time.

In addition, in the above-mentioned embodiment, by indicating the information of the permitted location service client, it is able to screen the location service clients who want to acquire the location of the user terminal. It is not difficult to see that the user terminal may not permit too frequent location acquisition by setting the information of permitted location service clients and the information of non-permitted location service clients. For example, according to the type of the client, only a location request for emergency services may be permitted, or only a location service client trusted by the user or preset by the UE may be permitted to acquire the location request.

In addition, the above-mentioned permitted use information may refer to actions related to permitting or permitting subsequent execution to acquire the location of the user terminal under the designated use; the above-mentioned permitted use information may refer to not permitting under the designated use The purpose of acquiring the location of the user terminal; it is not permitted to perform or is not permitted to perform subsequent actions related to acquiring the location of the user terminal. It is not difficult to see that some uses are for emergency services, user terminals can permit, and some uses are commercial, user terminals may not permit.

In addition, the above-mentioned permitted terminal state information may refer to permitting to perform the relevant behavior of acquiring the location of the user terminal or permitting to perform the subsequent relevant behavior of acquiring the location of the user terminal; the above-mentioned non-permitted terminal state information may refer to not permitting to perform the relevant behavior of acquiring the location of the user terminal or not permitting to perform the subsequent relevant behavior of acquiring the location of the user terminal. For example: when the user terminal is in the idle state or inactive state, if a location request is required, the user terminal needs to be paged, and the user terminal needs to establish a connection or restore the connection, and more signaling overhead is required; if only the user is acquired in the connected state The terminal location can save a lot of signaling overhead; in the connected state, frequent measurement of the user terminal location will occupy the measurement overhead of the user terminal. If the location of the user terminal is permitted to be acquired in other states, the measurement overhead of the user terminal can be saved. The user terminal can be implemented by the permitted terminal state information and the non-permitted terminal state information.

The above-mentioned permitted location type information may refer to permitting to perform the relevant behavior of the location type information, and the above-mentioned non-permitted location type information may refer to not permitting to perform the relevant behavior of the location type information. For example: "current location" needs to be initiated by location measurement, and "latest location" is the latest measured location out of the box, which is not needed to measure, thereby saving resources. The "historical location" relates to the trajectory of the user terminal, and involves more privacy of the user terminal. The user terminal can set different types of locations that are permitted or not permitted according to its own requirements or preferences, so as to achieve the effect of saving power consumption of the user terminal or protecting the privacy of the user terminal.

The above-mentioned permitted movement area range information may be that the relevant behavior of acquiring the location of the user terminal is permitted to be performed within the movement area range indicated by the control information. However, the above-mentioned information about the range where the mobile area that is not permitted may be that it is not permitted to perform the relevant behavior of acquiring the location of the user terminal within the range where the mobile area indicated by the control information. By permitting and/or not permitting the range where the mobile area, the effects of saving power consumption of the user terminal and protecting the privacy of the user terminal can be achieved, because the power consumption of the user terminal for location measurement in some moving area ranges may be different or the location privacy tendency is different. For example, in some mobile areas, the user may not want to disclose the location of the user terminal.

The above-mentioned permissive location measurement technology information may be an instruction to permit a specific location measurement technology to perform the relevant action of acquiring the location of the user terminal, and the above-mentioned non-permitted location measurement technology information may be an instruction to permit the specific location measurement technology. Behaviors related to acquiring the location of the user terminal. For example, some location measurement technologies are user terminal-led (such as UTDOA), which requires more power consumption of the user terminal; some location measurement technologies are dominated by radio access network nodes and require relatively few user terminals, so that the user terminal Different measurement technical requirements can be permitted and/or not permitted according to their own requirements. In addition, it can also be sent directly to the radio access network (Radio Access Network, RAN), or sent to the LCS and then sent to the RAN.

In this embodiment, the location service client information, usage information, terminal status information, location type information, moving area range information, and location measurement technical information can be referred to as described below, but this is not limited.

Optionally, the location service client information includes at least one of: an identity of the location service client, a name of the identity of the location service client, a domain name address of the identity of the location service client, an identity of a requester of a location service client party, a name of the requester of the location service client party, an IP address of the requester of the location service client party, a type of a location request of the location service client and a port number applied by a location service client end; and/or the usage information includes at least one of an emergency business use and a commercial use; and/or the terminal status information includes at least one of: an idle state, a connected state, an inactive state, available or unavailable before a location measurement and when powering on and off; and/or the location type information includes at least one of: a current location, a historical location and a latest location; and/or the moving area range information includes at least one of: a Tracking Area (TA) identity list, a radio access network node identity list, a mobile management unit list, an Authentication Management Function (AMF) identity list, a Mobile Management Entity (MME) identity list, a location area list, a cell list of a service area list; and/or the location measurement technical information includes at least one of: an Enhanced Cell-ID (ECID) measurement, an Observed Time Difference of Arrival (OTDOA) measurement and an Uplink Time Difference of Arrival (UT-DOA) measurement.

The above-mentioned available state may be a state where location service can be used, but may not be used before the location measurement may be a state of a preset time (for example, 1 second or 0.1 second, or even shorter time) before the location measurement is not available. For example: before the location measurement is not possible due to the user terminal, such as the moment of shutdown, or before the location service capability is completely turned off, or the time when the user terminal coverage begins to deteriorate to the point where it cannot support the location service. By permitting the reporting of the status unavailable before the location measurement, the last location of the user terminal can be acquired, which is useful for emergency service-related locating requirements.

In addition, in some embodiments, an indication of whether to request privacy verification to the location request is received. Upon receiving the location request of the user terminal, according to the above control information, the network unit may decide whether to request the user terminal to permit the location request operation. In an embodiment, when the location of the user terminal is permitted to be acquired and/or the location of the user terminal is permitted to be disclosed, the network still needs to decide whether to request the user terminal to perform privacy authentication on the location request of the UE according to the indication.

Optionally, the control information indicates whether it is needed to request the user terminal to perform a verification request of acquiring the location of the user terminal on a location request in the case that the location of the user terminal needs to be acquired.

It should be noted that the indication here can be implemented in combination with the indication described above, for example: in conjunction with the permitting to perform the relevant behavior of acquiring the location of the user terminal indicated hereinabove. Of course, the indication here may also be implemented separately. The embodiments of the disclosure are not limited herein.

In this embodiment, the control information indicates at least one of: needing to verify the location request, information of a location service client that needs to verify the location request; not needing to verify the location request, information of a location service client that does not need to verify the location request.

In this embodiment, it is able to indicate whether the location request needs to be verified or not, so that it is able to indicate whether to skip the verification process, thereby saving the user terminal and network overhead. Of course, in one embodiment, when the location of the user terminal is permitted to be acquired and/or the location of the user terminal is permitted to be disclosed, the network still has to decide whether to request the user terminal to perform privacy authentication on the location request of the user terminal according to the indication.

Optionally, the relevant behavior of acquiring the location of the user terminal includes at least one of:

whether to send to the user terminal a verifying request of acquiring the location of the user terminal;

whether to acquire the location of the user terminal;

whether to request a radio access network unit to trigger a location measurement for the user terminal;

whether to trigger the user terminal to perform a location measurement;

whether successfully responded to a received location request for the user terminal;

whether to disclose the acquired location of the user terminal; and whether requiring to start a timer.

For example, the above-mentioned relevant behavior of acquiring the location of the user terminal may refer to, when (for example, a network unit or a location service client) generates a location request of acquiring the location of the user terminal or receives a location request of the user terminal:

whether to send to the user terminal a verifying request of acquiring the location of the user terminal;

whether to acquire the location of the user terminal;

whether to request a radio access network unit to trigger a location measurement for the user terminal;

whether to trigger the user terminal to perform a location measurement;

whether successfully responded to a received location request for the user terminal;

whether to disclose the acquired location of the user terminal; and whether requiring to start a timer.

In this embodiment, it is able to permit or not permit, or permit within the permission range, or not permit at least one of the above-mentioned relevant behaviors of acquiring the location of the user terminal within the not-permission range, thereby saving transmission resources and user terminal power consumption. For example, within the permission range, when a request for acquiring the location of the user terminal is generated, a permission verifying request to acquire the location of the user terminal is permitted, the acquiring of the location of the user terminal is permitted, the triggering the user terminal to perform a location measurement is permitted or the response to location acquiring requests sent by location service clients is permitted. For another example: within the non-permission range, when a request for acquiring the location of the user terminal is generated, a permission verifying request to acquire the location of the user terminal is not permitted, the acquiring of the location of the user terminal is not permitted, the triggering the user terminal to perform a location measurement is not permitted or the response to location acquiring requests sent by location service clients is not permitted.

Of course, in the embodiment of the present disclosure, the relevant actions of acquiring the location of the user terminal include, but are not limited to, the actions of the above list.

Optionally, Step 302 may include: when it is determined that the predetermined condition is satisfied, sending network unit or location service client control information configured to control the relevant behavior of acquiring the location of the user terminal.

Step 302 may be sending the above control information to the network unit, for example: NAS message or RRC message to send the above control information to the network unit. The above network unit may include at least one of: radio access network node, radio access network function, core network function, core network node, mobility management node, mobility management function, location service management function, location service management Node, location service management client, eNB, gNB, AMF, MME, LCS and E-SMLC.

After the network unit or the location service client receives the control information hereinabove, it can perform corresponding control according to the above control information. For example, within the permission range, when a request for acquiring the location of the user terminal is generated, a permission verifying request to acquire the location of the user terminal is performed, the location of the user terminal is acquired, the user terminal is triggered to perform a location measurement or location acquiring requests sent by location service clients is responded. For another example: within the non-permission range, when a request for acquiring the location of the user terminal is generated, a permission verifying request to acquire the location of the user terminal is performed, the location of the user terminal is acquired, the user terminal is triggered to perform a location measurement or location acquiring requests sent by location service clients is responded.

In this embodiment, a variety of optional implementations are added on the basis of the embodiment shown in FIG. 2, and can save transmission resources and power consumption of the user terminal.

Figure 4:
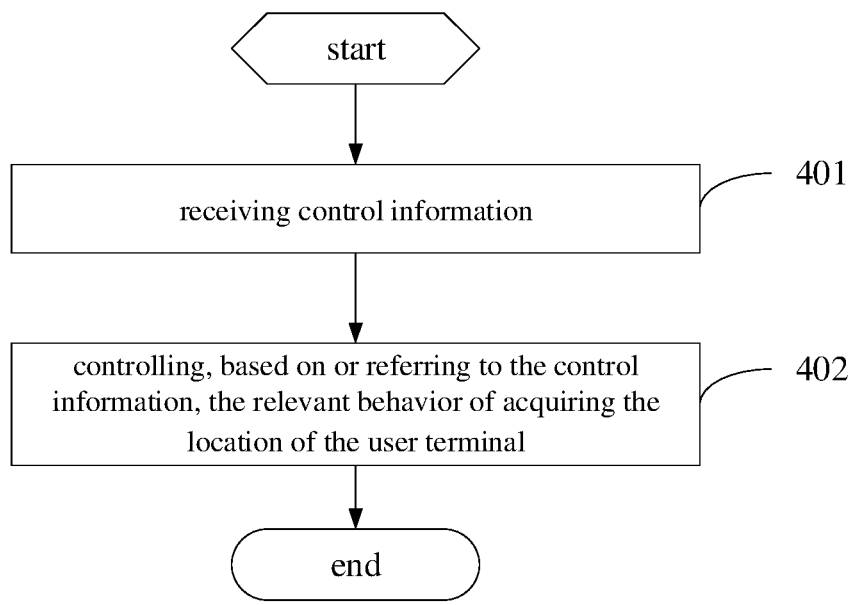
FIG. 4 is a flowchart of a method of controlling a location acquisition in another embodiment of the present disclosure.

Referring to FIG. 4 which is a flowchart of a method of controlling a location acquisition in another embodiment of the present disclosure. The method is applied to a network unit or a location service client. As shown in FIG. 4, the method includes the following steps:

Step 401: receiving control information configured to control a relevant behavior of acquiring a location of a user terminal.

The above control information may be control information sent by the user terminal, for example, may be control information forwarded or transparently transmitted by the user terminal through the radio access network unit.

Step 402: controlling, based on or referring to the control information, the relevant behavior of acquiring the location of the user terminal.

The above-mentioned control of the relevant behavior of acquiring the location of the user terminal may be acquiring the location of the user terminal, not permitting the acquiring of the location of the user terminal, etc., for details, reference may be made to the following description.

Through the above steps, some meaningless signaling overhead can be reduced to save transmission resources, and the power consumption of the user terminal can also be reduced.

Optionally, the control information indicates at least one of:

whether to permit to perform the relevant behavior of acquiring the location of the user terminal;

whether to permit a currently requested relevant behavior of acquiring the location of the user terminal;

whether to permit a subsequent relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; and a non-permission condition for not permitting to disclose the acquired location of the user terminal.

For the above control information, reference may be made to the relevant description of the embodiment shown in FIG. 3, which will not be repeated here, and the same beneficial effects can be achieved.

Optionally, the control information indicates permitting the relevant behavior of acquiring the location of the user terminal; and/or the control information indicates permitting the subsequent relevant behavior of acquiring the location of the user terminal; and/or the control information indicates a permission range where permitting the relevant behavior of acquiring the location of the user terminal; and/or the control information indicates a permission range where permitting the subsequent relevant behavior of acquiring the location of the user terminal;

the controlling, based on or referring to the control information, the relevant behavior of acquiring the location of the user terminal includes:

performing the relevant behavior of acquiring the location of the user terminal, based on or referring to the control information; and/or performing the subsequent relevant behavior of acquiring the location of the user terminal, based on or referring to the control information; and/or performing the relevant behavior of acquiring the location of the user terminal, based on or referring to the control information and within a permission range where permitting the relevant behavior of acquiring the location of the user terminal indicated by the control information; and/or performing the subsequent relevant behavior of acquiring the location of the user terminal, based on or referring to the control information and within a permission range where permitting the subsequent relevant behavior of acquiring the location of the user terminal indicated by the control information.

In this embodiment, relevant behaviors may be performed based on or referring to the above control information, and the relevant behaviors may be performed within a specific range, so that user terminal and network overhead may be saved.

Optionally, the control information indicates not permitting to acquire the location of the user terminal; and/or the control information indicates a non-permission range where not permitting to acquire the location of the user terminal; and/or the control information indicates not permitting to acquire the location of the user terminal subsequently; and/or the control information indicates a non-permission range where not permitting to acquire the location of the user terminal subsequently;

the controlling, based on or referring to the control information, the relevant behavior of acquiring the location of the user terminal includes:

not permitting to acquire the location of the user terminal, based on or referring to the control information; and/or not permitting to acquire the location of the user terminal, based on or referring to the control information and within a non-permission range where not permitting to acquire the location of the user terminal indicated by the control information; and/or not permitting to acquire the location of the user terminal subsequently, based on or referring to the control information; and/or not permitting to acquire the location of the user terminal subsequently, based on or referring to the control information and within a non-permission range where not permitting to acquire the location of the user terminal subsequently indicated by the control information.

In this embodiment, relevant behaviors may not be permitted based on or referring to the above control information, and the location of the user terminal may not be permitted to be acquired within a specific range, thereby saving user terminal and network overhead.

Optionally, the control information further indicates at least one of:

whether to permit to disclose the acquired location of the user terminal; and/or a permission range where permitting to disclose the acquired location of the user terminal; and/or a non-permission range where not permitting to disclose the acquired location of the user terminal, the controlling, based on or referring to the control information, the relevant behavior of acquiring the location of the user terminal includes:

disclosing the acquired location of the user terminal, based on or referring to the control information; and/or disclosing the acquired location of the user terminal, based on or referring to the control information and within the permission range where permitting to disclose the acquired location of the user terminal; and/or not permitting to disclose the acquired location of the user terminal, based on or referring to the control information and within the non-permission range where not permitting to disclose the acquired location of the user terminal.

In this embodiment, the location of the user terminal may be disclosed based on or referring to the control information sent by the user terminal, or the location of the user terminal is not permitted to be disclosed, so that the privacy of the user terminal can be protected.

Optionally, the control information indicates the permission range by indicating a permission condition; and/or the control information indicates the permission range by indicating a non-permission condition, where a range that does not satisfy the non-permission condition belongs to the permission range; and/or the control information indicates the non-permission range by indicating a non-permission condition; and/or the control information indicates the non-permission range by indicating a permission condition, where a range that does not satisfy the non-permission condition belongs to the permission range.

For the above control information, reference may be made to the relevant description of the embodiment shown in FIG. 3, which will not be repeated here, and the same beneficial effects can be achieved.

Optionally, the permission condition includes at least one of: a permitted time period, a permitted time duration, permitted location service client information, permitted usage information, permitted terminal status information, permitted location type information, permitted moving area range information and permitted location measurement technical information; and/or the non-permission condition includes at least one of: a non-permitted time period, a non-permitted time duration, non-permitted location service client information, non-permitted usage information, non-permitted terminal status information, non-permitted location type information, non-permitted moving area range information and non-permitted location measurement technical information.

For the above permission conditions and non-permission conditions, reference may be made to the relevant description of the embodiment shown in FIG. 3, which will not be repeated here, and the same beneficial effects can be achieved.

Optionally, the location service client information includes at least one of: an identity of the location service client, a name of the identity of the location service client, a domain name address of the identity of the location service client, an identity of a requester of a location service client party, a name of the requester of the location service client party, an IP address of the requester of the location service client party, a type of a location request of the location service client and a port number applied by a location service client end; and/or the usage information includes at least one of an emergency business use and a commercial use; and/or the terminal status information includes at least one of: an idle state, a connected state, an inactive state, available or unavailable before a location measurement and when powering on and off; and/or the location type information includes at least one of: a current location, a historical location and a latest location; and/or the moving area range information includes at least one of: a Tracking Area (TA) identity list, a radio access network node identity list, a mobile management unit list, an Authentication Management Function (AMF) identity list, a Mobile Management Entity (MME) identity list, a location area list, a cell list of a service area list; and/or the location measurement technical information includes at least one of: an Enhanced Cell-ID (ECID) measurement, an Observed Time Difference of Arrival (OTDOA) measurement and an Uplink Time Difference of Arrival (UT-DOA) measurement.

For the above information, please refer to the relevant description of the embodiment shown in FIG. 3, which will not be repeated here, and the same beneficial effects can be achieved.

Optionally, the control information indicates whether it is needed to request the user terminal to perform a permission verification on a location request in the case that the location of the user terminal needs to be acquired;

the controlling, based on or referring to the control information, the relevant behavior of acquiring the location of the user terminal includes:

determining whether it is needed to request the user terminal to perform a permission verification on a location request, based on or referring to the control information, in the case that the location of the user terminal needs to be acquired.

In this embodiment, it is able to determine whether to request the user terminal to perform permission verification on the location request according to or referring to the above control information, for example: the control information indicates that when the location of the user terminal needs to be acquired, the user terminal does not need to be requested to perform the permission verification on the location request, and the network unit may acquire the location of the user terminal, thereby reducing verification signaling and saving transmission resources.

Optionally, the control information indicates at least one of: needing to verify the location request, information of a location service client that needs to verify the location request: not needing to verify the location request, information of a location service client that does not need to verify the location request.

For the above control information, reference may be made to the relevant description of the embodiment shown in FIG. 3, which will not be repeated here, and the same beneficial effects can be achieved.

Optionally, before receiving the control information, the method further includes at least one of:

sending an acquiring request of acquiring the location of the user terminal;

sending a verifying request of acquiring the location of the user terminal;

sending a request of acquiring current control information; and sending a request of acquiring updated control information.

In this embodiment, the control information of the user terminal may be acquired through at least one of the above four requests, and then the relevant behavior of acquiring the location of the user terminal may be controlled according to the acquired control information, so as to save the overhead of the user terminal and the network.

Optionally, the controlling the relevant behavior of acquiring the location of the user terminal includes at least one of:

permitting the relevant behavior of acquiring the location of the user terminal;

not permitting the relevant behavior of acquiring the location of the user terminal;

starting a timer.

The above permitting the relevant behavior of acquiring the location of the user terminal may be understood as performing the relevant behavior of acquiring the location of the user permitted by the control information. The above not permitting the relevant behavior of acquiring the location of the user terminal and starting a timer may be understood as performing not permitting the relevant behavior of acquiring the location of the user within a certain period of time, and the control is implemented by starting the timer. That is, after the timer is started and before it expires, performing not permitting the relevant behavior of acquiring the location of the user. The time duration of the timer may be pre-configured, or configured according to the permitted time duration indicated in the above control information. Starting the timer may also be understood as performing permitting the relevant behavior of acquiring the location of the user within a certain period of time, and the control is implemented by starting the timer. That is, after the timer is started and before it expires, performing permitting the relevant behavior of acquiring the location of the user. The time duration of the timer may be configured according to the permitted time duration indicated in the above control information.

In this embodiment, by performing or not permitting the corresponding behavior, the overhead of the user terminal and the network can be saved.

Optionally, the controlling, based on or referring to the control information, the relevant behavior of acquiring the location of the user terminal includes:

starting a timer to perform a time counting in the case that control information indicates not permitting a subsequent relevant behavior of acquiring the location of the user terminal, and performing the subsequent not permitting the relevant behavior of acquiring the location of the user terminal after the timer starts to perform the time counting and before the timer expires;

where the time counting duration is preset or set according to a non-permitted time duration indicated by the control information;

and/or starting a timer to perform a time counting in the case that control information indicates not permitting the relevant behavior of acquiring the location of the user terminal, and performing not permitting the relevant behavior of acquiring the location of the user terminal before the timer expires;

where the time counting duration is preset or set according to a non-permitted time duration indicated by the control information;

and/or starting a timer to perform a time counting in the case that that control information indicates permitting the relevant behavior of acquiring the location of the user terminal and the control information indicates a permitted time, and permitting the relevant behavior of acquiring the location of the user terminal before the timer expires.

In this embodiment, relevant behaviors that are not permitted by the control information are not permitted during the special time, and relevant behaviors that are permitted by the control information are performed during the special time, so as to save the overhead of user terminal and network, and can also avoid the impact of circumstances that are not permitted or always permitted. In addition, when the timer expires, an inquiry request may be sent to the user terminal to ask whether to permit to acquire the user terminal's location and/or to disclose the user terminal's location, and the corresponding response message of the user terminal's inquiry request may be subsequently controlled according to the user terminal, thereby improving the flexibility of the system.

Optionally, the performing not permitting the relevant behavior of acquiring the location of the user terminal includes at least one of:

directly feeding back a user terminal location acquisition failure, in the case that a location request for the user terminal is received;

not sending a verifying request of acquiring the location of the user terminal to the user terminal;

not acquiring the location of the user terminal;

not requesting a radio access network unit to trigger a location measurement for the user terminal;

not triggering the user terminal to perform a location measurement; and not responding to a location acquiring request sent by a location service client.

For example, the above-mentioned performing not permitting the relevant behavior of acquiring the location of the user terminal, refers to, when there is a requirement of acquiring the location of the user terminal or when a request for the user terminal' location is received:

directly feeding back a user terminal location acquisition failure, in the case that a location request for the user terminal is received;

not sending a verifying request of acquiring the location of the user terminal to the user terminal;

not acquiring the location of the user terminal;

not requesting a radio access network unit to trigger a location measurement for the user terminal;

not triggering the user terminal to perform a location measurement; and not responding to a location acquiring request sent by a location service client.

In this embodiment, the above behavior can save the overhead of user terminal and network. It should be noted that, the above-mentioned relevant behaviors of performing the subsequent not permitting the relevant behavior of acquiring the location of the user terminal may also refer to, when at least one of the requirements for the user terminal' location is generated or the request for the user terminal's location is received:

directly feeding back a user terminal location acquisition failure, in the case that a location request for the user terminal is received;

not sending a verifying request of acquiring the location of the user terminal to the user terminal;

not acquiring the location of the user terminal;

not requesting a radio access network unit to trigger a location measurement for the user terminal;

not triggering the user terminal to perform a location measurement; and not responding to a location acquiring request sent by a location service client.

The performing the subsequent not permitting the relevant behavior of acquiring the location of the user terminal may also save the overhead of user terminal and network.

Optionally, the performing permitting the relevant behavior of acquiring the location of the user terminal includes at least one of:

sending a verifying request of acquiring the location of the user terminal to the user terminal;

acquiring the location of the user terminal;

requesting a radio access network unit to trigger a location measurement for the user terminal;

triggering the user terminal to perform a location measurement;

responding to a location acquiring request sent by a location service client, to acquire the location of the user terminal; and responding to a received location request for the user terminal, to acquire the location of the user terminal.

For example, the above-mentioned performing permitting the relevant behavior of acquiring the location of the user terminal, refers to that when a requirement for acquiring the location of the user terminal is generated or a request for the user terminal's location is received, at least one of the following is performed:

sending a verifying request of acquiring the location of the user terminal to the user terminal;

acquiring the location of the user terminal;

requesting a radio access network unit to trigger a location measurement for the user terminal;

triggering the user terminal to perform a location measurement;

responding to a location acquiring request sent by a location service client, to acquire the location of the user terminal; and responding to a received location request for the user terminal, to acquire the location of the user terminal.

In this embodiment, it is able to perform corresponding behavior under the conditions permitted by the control information, thereby ensuring the performance of the location service.

Optionally, subsequent to the receiving the control information and prior to the controlling the relevant behavior of acquiring the location of the user terminal based on or referring to the control information, the method further includes:

determining whether to receive the control information and returning back to the user terminal a return message of whether to determine to receive the control information and/or the received control information;

the controlling, based on or referring to the control information, the relevant behavior of acquiring the location of the user terminal includes:

controlling the relevant behavior of acquiring the location of the user terminal, based on or referring to the control information, in the case that the control information is received.

In this embodiment, the above-mentioned return message may increase the interactivity between the network units or the location service clients.

Optionally, the network unit includes but not limited to at least one of: a radio access network node, a radio access network function, a core network function, a core network node, a mobile management node, a mobile management function, a location service management function, a location service management node, a location service management client, an evolved Node B (eNB), an Access and Mobility Management Function (AMF), a Mobile Management Entity (MME), a Location Service (LCS) function and an Enhanced Serving Mobile Location Centre (E-SMLC).

For the above network unit, reference may be made to the relevant description of the embodiments shown in FIG. 2 and FIG. 3, and details are not described here.

It should be noted that this embodiment is an implementation manner of a network unit or a location service client corresponding to the embodiments shown in FIGS. 2 to 3. For a specific implementation manner, reference may be made to the related descriptions of the embodiments shown in FIGS. 2 to 3, the same beneficial effect may be achieved, in order to avoid duplication of description, the details thereof are omitted here.

Figure 5:
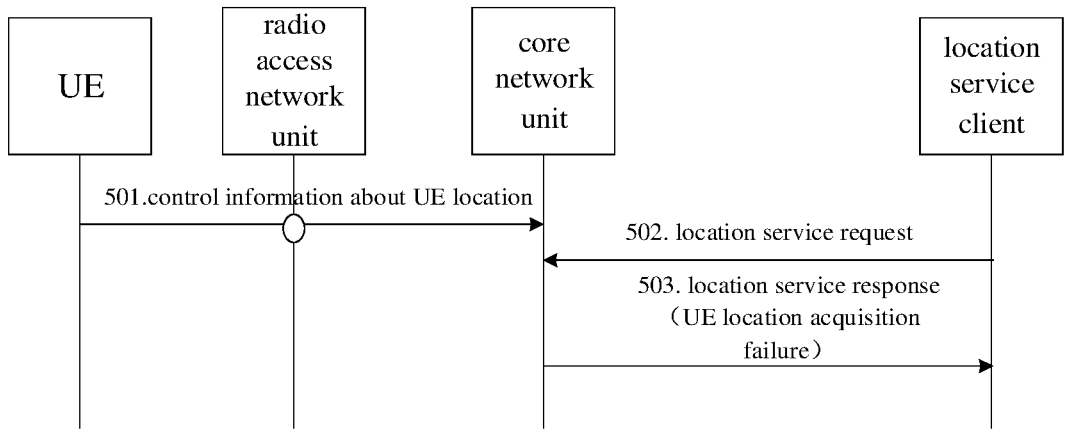
FIG. 5 is a schematic view of a method of controlling a location acquisition in another embodiment of the present disclosure.

Referring to FIG. 5 which is a schematic view of a method of controlling a location acquisition in another embodiment of the present disclosure. As shown in FIG. 5, the method includes the following steps:

Step 501: a user terminal (UE) sends control information about UE location acquisition to core network units (such as AMF and MME). For the control information, reference may be made to the control information of the embodiments shown in FIG. 2 to FIG. 4, and details are not described herein again.

The user terminal sends control information about the location of the user terminal to the core network unit through the radio access network unit. The control information about the location acquisition of the UE is as described in the control information in step 302, and is not repeated here.

Optionally, the UE may send to the core network unit through an RRC message or a NAS message.

The UE may send to the core network unit through the following but not limited to the following messages. Registration request (such as Registration request, Attach Request), registration completed (such as Registration Complete, Attach Complete), location update request message (such as Registration request, TAU Request), location update completed (such as Registration Complete, TAU Complete), control information about UE location acquisition is sent to the mobility management node/function in location request permission verification response. NAS messages are transparently transmitted through the radio access network unit.

The RRC message is sent through the radio access network unit, and then the radio access network unit forwards it to the management node/function (such as AMF, MME) through the S1 or NG interface message.

The mobile management node/function (such as AMF, MME) can send control information about the location acquisition of the UE to the location service management node/function (such as E-SMLC, LCS).

The core network unit here may include multiple network nodes or network functions (mobile management node/function, location service management node/function, user data management node/function, etc.). In the embodiment, the operation between network nodes or network functions in the core network unit is not limited. The mobile management node/function or location service management node/function may save or update the control information about the UE location acquisition. The mobile management node/function or location service management node/function may send the control information about the UE location acquisition to the user data management node/function (such as HSS, UDM) for storage or update.

Step 502: The location service client sends a location service request to a core network unit (such as a location service management unit). After receiving the location request sent by the location service client, the location service management unit may generate a location request about the UE and send it to the mobile management unit. The mobility management unit sends the result of acquiring the location of the UE to the location service management unit. The interoperable location between the location service management unit and the mobility management unit is not limited in the embodiment.

The core network unit controls the location service request of the location service client according to the received control information, UE subscription information and/or UE capabilities. The core network unit may acquire the latest control information about the UE location acquisition from the user data management section unit.

When the control information about the UE location acquisition indicates that the UE location acquisition is not permitted, the core network unit may perform at least one of:
1) Reject the location service request from the location service client regarding the UE.
2) Start a timer (can be pre-configured) to count time.

Before the timer expires, the location service client's location request about the UE is rejected.

The core network unit may perform one of the following before receiving the control information sent by the UE to update the control information (such as not permitting UE location update to be permitted to acquire UE location): The location of the UE is not acquired, and the UE location measurement is not triggered to the wireless access node.

Step 503: The core network unit returns a location service response to the location service client, and explains the failure and/or the reason for failure to acquire the location of the UE. The reason for the failure may be that the user terminal does not permit it. The location service client can start a timer (which can be pre-configured) to count the time after receiving it. Before the timer expires, the location request about the UE is not sent to the network.

Figure 6:
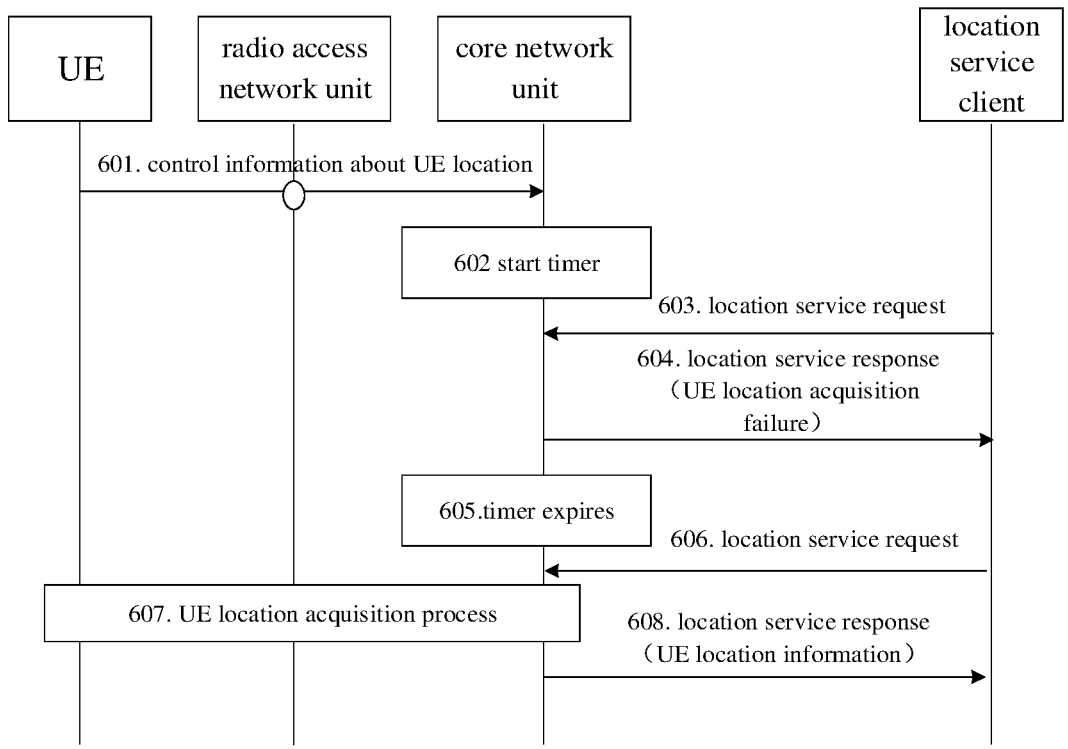
FIG. 6 is a schematic view of a method of controlling a location acquisition in another embodiment of the present disclosure.

Referring to FIG. 6 which is a schematic view of a method of controlling a location acquisition in another embodiment of the present disclosure. As shown in FIG. 6, the method includes the following steps:

Step 601 is the same as step 501 in the embodiment shown in FIG. 5 and will not be repeated here.

Step 602. When the control information regarding the UE location acquisition indicates that the time period/time duration for which the UE location acquisition is not permitted, the core network unit may perform at least one of:
1) The timer is started according to the time duration, and if a location service client request for a location service of the UE is received before the indicated time duration expires, it returns a failure to acquire the location of the UE, a back off timer and/or a failed Reason (for example, UE does not permit). The core network unit may set the back off timer (Back off timer) sent to the location service client according to the time duration. The back-off time may be greater than or equal to the time duration. During the specified back-off time, the location service client will not send a location request about the UE.
2) Initiate monitoring according to the time period, if within the indicated time period, if a location service client request for a location service from the UE is received, return failure to acquire the UE location, back off period and/or cause of failure (For example, UE does not permit). The core network unit may set a back off period (Back off period) sent to the location service client according to the time period. The back off period may include but is not limited to the time period. During the specified back-off period, the location service client will not send a location request about the UE.

Step 603: The core network unit receives the location service request about the UE sent by the location service client.

Step 604: The core network unit returns a location service response to the location service client, and explains the failure to acquire the location of the UE and/or the reason for the failure. The cause of the failure may be that the UE does not permit it. If the core network unit also returns the back-off time to the location service client, the location service client can start a timer according to the back-off time after receiving the time. Before the timer expires, the location request about the UE is not sent to the network. If the core network unit also returns the fallback time period to the location service client, the location service client does not send a location request about the UE to the network within the fallback time period after receiving it.

Step 605: The timer times out or the current time is not within the time period.

Step 606: The location service client sends a location service request about the UE to the core network unit.

Step 607: The core network unit initiates the process of acquiring the location of the UE, and this step is not limited in this embodiment.

Step 608: The core network unit returns a location service response to the location service client.

Figure 7:
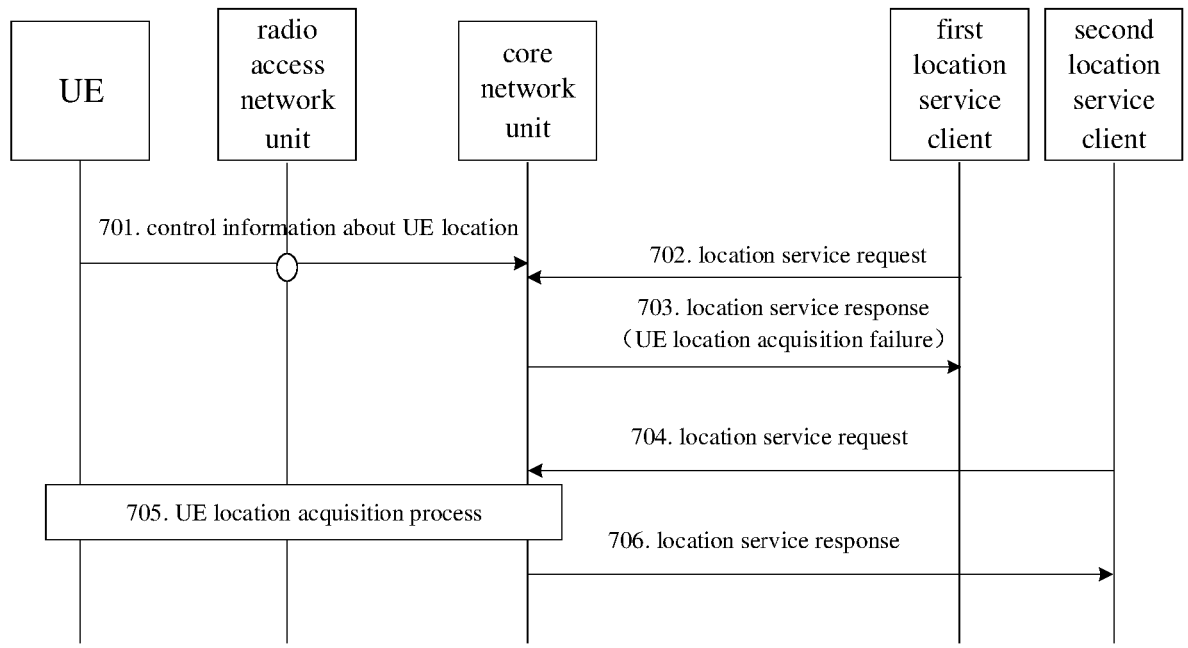
FIG. 7 is a schematic view of a method of controlling a location acquisition in another embodiment of the present disclosure.

Referring to FIG. 7 which is a schematic view of a method of controlling a location acquisition in another embodiment of the present disclosure. As shown in FIG. 7, the method includes the following steps:

Step 701 is the same as step 501 in the embodiment shown in FIG. 5 and will not be repeated here.

Step 702: The first location service client sends a location service request about the UE to the core network unit.

The control information regarding UE location acquisition indicates that location service client information that is not permitted to acquire the UE location or location service client information that is permitted to acquire the UE location is permitted.

The first location service client is a location service client indicated by the control information that is not permitted to acquire the location of the UE, and is not included in the location service client information indicated by the control information that is not permitted to acquire the location of the UE. The core network unit returns to the first location service client the failure to acquire the UE location, a back off timer (Back off timer), a back off period (Back off period), and/or the reason for the failure (such as UE not permit). If the control information regarding the location acquisition of the UE includes a time period/time duration that does not permit the first location service client to acquire the UE location, the core network unit may set the fallback time period according to the time period. The back-off time period may include but is not limited to the time period. The core network unit may set the back-off time according to the time duration. The back-off time may be greater than or equal to the time duration. After receiving the location service client, the location request for the UE is not initiated to the network within the back-off time and/or back-off time period.

Step 703: The core network unit returns a location service response to the location service client, and explains the failure to acquire the location of the UE and/or the reason for the failure.

Step 704: The second location service client sends a location service request about the UE to the core network unit. The second location service client is the location service client information that the control information indicates that the location of the UE is permitted to be acquired or is not included in the location service client information that the control information indicates that the location of the UE is not permitted to be acquired.

Step 705: The core network unit initiates the process of acquiring the location of the UE. This embodiment does not limit this step.

Step 706: The core network unit returns a location service response to the location service client.

Figure 8:
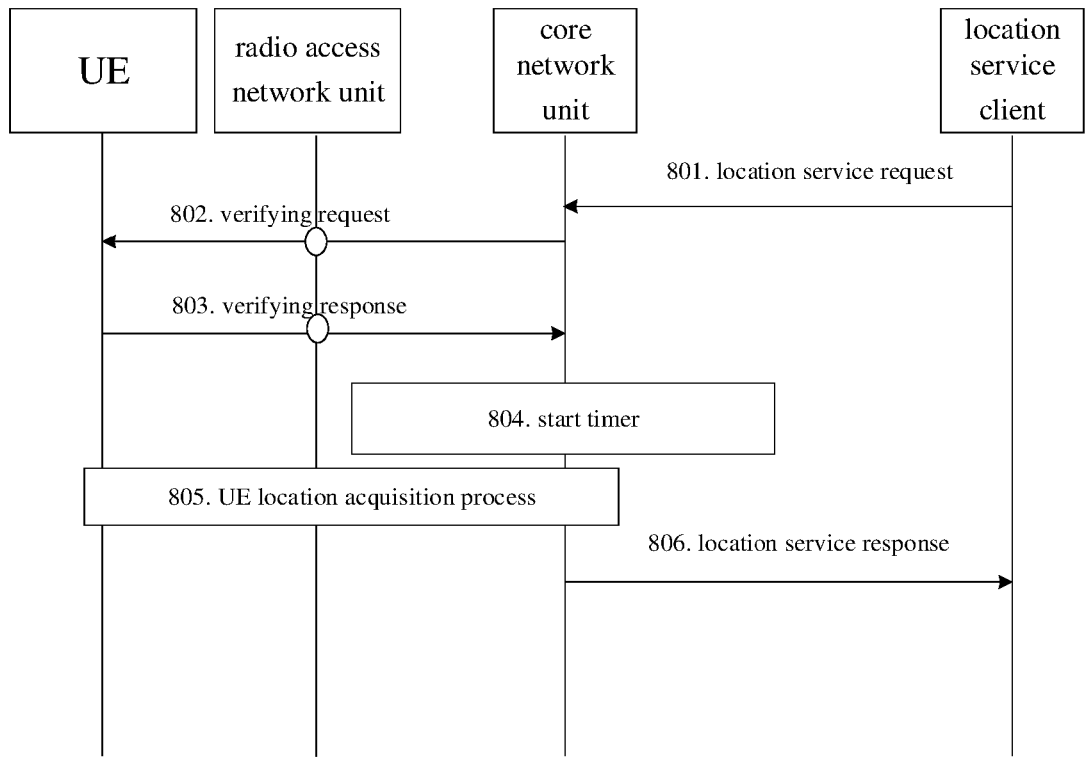
FIG. 8 is a schematic view of a method of controlling a location acquisition in another embodiment of the present disclosure.

Referring to FIG. 8 which is a schematic view of a method of controlling a location acquisition in another embodiment of the present disclosure. As shown in FIG. 8, the method includes the following steps:

Step 801: The location service client sends a location service request about the UE to the core network unit.

Step 802: The core network unit sends a verifying request or a location request for acquiring the location of the user terminal to the UE.

Step 803: The UE sends a verification response or location request response to the location request to the core network unit to the UE. Optionally, the above response contains control information about the location acquisition of the UE. The control information about the location acquisition of the UE is as described in the control information in step 302, and is not repeated here.

In some embodiments, the control information regarding the location acquisition of the UE indicates at least one of:

permitting the relevant behavior of acquiring the location of the user terminal this time requested by the network unit or location service client; do not permitting subsequent relevant behavior of acquiring the location of the user terminal;

the time duration of the subsequent behavior of acquiring the location of the user terminal is not permitted;

the time duration of not permitting the subsequent relevant behavior of acquiring the location of the user terminal can be set by indicating the time duration of the non-permission condition in the control information that does not permit the subsequent relevant behavior of acquiring the location of the user terminal.

The time duration of not permitting subsequent relevant behaviors of acquiring the location of the user terminal may refer to waiting for a period of time before permitting subsequent relevant behaviors regarding acquiring the location of the UE or may refer to not permitting subsequent relevant behavior regarding acquiring the location of the UE. The relevant behavior of acquiring the location of the UE in this embodiment is as described in step 302, and will not be repeated here.

In some embodiments, the UE's current situation (energy, overhead) may not support frequent location measurements. In a friendly manner, this location request for the UE may be permitted this time, but it is achieved by setting a period of time that does not permit subsequent relevant behaviors regarding acquiring the location of the UE.

Step 804: The core network unit receives that the verification response information includes the control information and the control information indicates that the relevant behavior of not permitting subsequent acquisition of the location of the user terminal is permitted. The core network unit may start a timer according to the default configuration to count time.

When the core network unit receives the verification response information that includes the control information and the control information indicates a time duration that does not permit subsequent relevant behaviors to acquire the location of the user terminal, it may start a timer according to the time duration to count time.

Before the timer expires, the core network unit performs at least one of: other location requests received from the location service client regarding the UE all return failure, do not send the UE a verifying request regarding acquiring the location of the user terminal, and do not trigger acquisition The UE's location behavior does not request the radio access network unit to trigger the behavior of acquiring the UE's location.

Step 805: The core network unit triggers the process of acquiring the location of the UE this time to acquire the location of the UE.

Step 806: The core network unit sends a location service response to the location service client this time, which may include a back off timer. The location service client does not initiate a location request for the UE to the network within the backoff time after receiving the backoff time. The core network unit sets the back-off time according to the time duration provided by the UE that does not permit subsequent location acquisition of the UE. The back-off time may be greater than or equal to the time duration.

Figure 9:
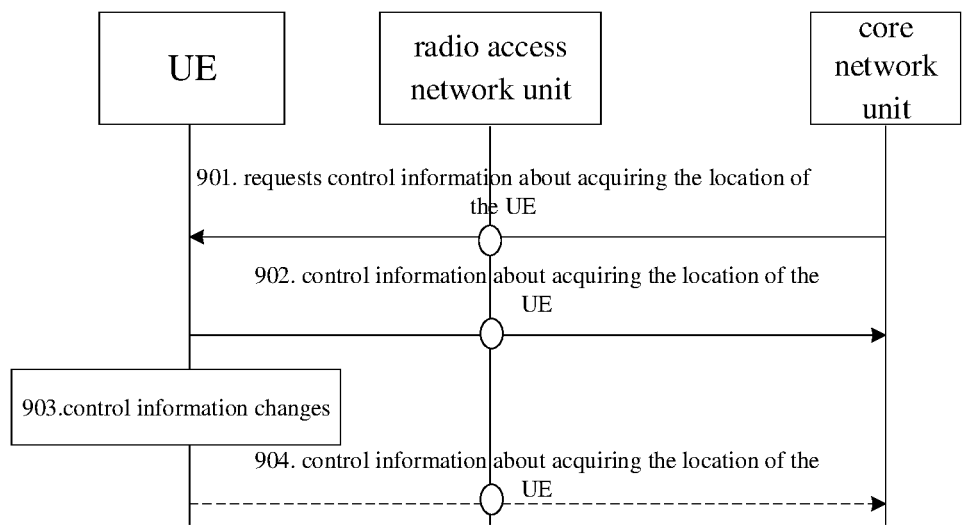
FIG. 9 is a schematic view of a method of controlling a location acquisition in another embodiment of the present disclosure.

Referring to FIG. 9 which is a schematic view of a method of controlling a location acquisition in another embodiment of the present disclosure. As shown in FIG. 9, the method includes the following steps:

Step 901: The core network unit requests control information about acquiring the location of the UE from the UE through the radio access network unit.

The request may indicate at least one of:

requesting current control information of the UE about acquiring the location of the UE; the control information about acquiring the location of the UE is as described in the control information in step 302, and details are not described herein again;

requesting the UE to report the updated control information on acquiring the UE location when the control information on acquiring the UE location changes.

Step 902: The UE returns control information about acquiring the location of the UE to the core network unit. After receiving the control information, the core network unit controls relevant behaviors regarding acquiring the location of the UE according to or referring to the control information.

Step 903: The control information on the UE side about acquiring the location of the UE is changed, for example, the tendency of the UE or the user about acquiring the location of the UE is changed. According to the request in step 901, the UE determines whether to send the updated control information about acquiring the location of the UE after sending the update to the core network. If it is decided to send, step 904 is entered, otherwise the process ends.

Step 904: The UE sends updated control information about acquiring the location of the UE to the core network unit. The core network unit updates according to the received control information, and subsequently controls relevant behaviors regarding acquiring the location of the UE according to the updated control information.

The information sent by the UE to the core network unit can be forwarded or transparently transmitted through the radio access network.

Figure 10:
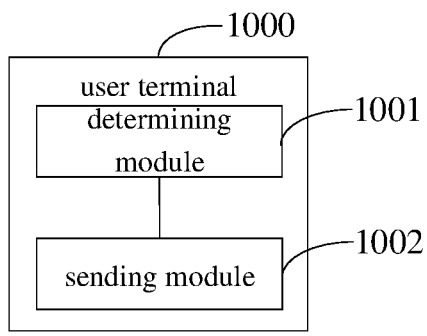
FIG. 10 is a structural diagram of a user terminal in an embodiment of the present disclosure.

Referring to FIG. 10 which is a structural diagram of a user terminal in an embodiment of the present disclosure. As shown in FIG. 10, the user terminal 1000 includes:

a determining module 1001, configured to determine whether a predetermined condition is satisfied;

a sending module 1002, configured to, in the case that the predetermined condition is satisfied, send control information configured to control a relevant behavior of acquiring a location of the user terminal.

Optionally, the control information indicates at least one of:

whether to permit to perform the relevant behavior of acquiring the location of the user terminal;

whether to permit a currently requested relevant behavior of acquiring the location of the user terminal;

whether to permit a subsequent relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; and a non-permission condition for not permitting to disclose the acquired location of the user terminal.

Optionally, the control information indicates permitting the relevant behavior of acquiring the location of the user terminal; and/or the control information indicates permitting the subsequent relevant behavior of acquiring the location of the user terminal; and/or the control information indicates a permission range where permitting the relevant behavior of acquiring the location of the user terminal; and/or the control information indicates a permission range where permitting the subsequent relevant behavior of acquiring the location of the user terminal.

Optionally, the control information indicates not permitting to acquire the location of the user terminal; and/or the control information indicates a non-permission range where not permitting to acquire the location of the user terminal; and/or the control information indicates not permitting to acquire the location of the user terminal subsequently; and/or the control information indicates a non-permission range where not permitting to acquire the location of the user terminal subsequently.

Optionally, the control information further indicates at least one of:

whether to permit to disclose the acquired location of the user terminal; and/or a permission range where permitting to disclose the acquired location of the user terminal; and/or a non-permission range where not permitting to disclose the acquired location of the user terminal.

Optionally, the control information indicates the permission range by indicating a permission condition; and/or the control information indicates the permission range by indicating a non-permission condition, where a range that does not satisfy the non-permission condition belongs to the permission range; and/or the control information indicates the non-permission range by indicating a non-permission condition; and/or the control information indicates the non-permission range by indicating a permission condition, where a range that does not satisfy the non-permission condition belongs to the permission range.

Optionally, the permission condition includes at least one of: a permitted time period, a permitted time duration, permitted location service client information, permitted usage information, permitted terminal status information, permitted location type information, permitted moving area range information and permitted location measurement technical information; and/or the non-permission condition includes at least one of: a non-permitted time period, a non-permitted time duration, non-permitted location service client information, non-permitted usage information, non-permitted terminal status information, non-permitted location type information, non-permitted moving area range information and non-permitted location measurement technical information.

Optionally, the location service client information includes at least one of:

an identity of the location service client, a name of the identity of the location service client, a domain name address of the identity of the location service client, an identity of a requester of a location service client party, a name of the requester of the location service client party, an IP address of the requester of the location service client party, a type of a location request of the location service client and a port number applied by a location service client end; and/or the usage information includes at least one of an emergency business use and a commercial use; and/or the terminal status information includes at least one of: an idle state, a connected state, an inactive state, available or unavailable before a location measurement and when powering on and off; and/or the location type information includes at least one of: a current location, a historical location and a latest location; and/or the moving area range information includes at least one of: a Tracking Area (TA) identity list, a radio access network node identity list, a mobile management unit list, an Authentication Management Function (AMF) identity list, a Mobile Management Entity (MME) identity list, a location area list, a cell list of a service area list; and/or the location measurement technical information includes at least one of: an Enhanced Cell-ID (ECID) measurement, an Observed Time Difference of Arrival (OTDOA) measurement and an Uplink Time Difference of Arrival (UTDOA) measurement.

Optionally, the control information indicates whether it is needed to request the user terminal to perform a permission verification on a location request in the case that the location of the user terminal needs to be acquired.

Optionally, the control information indicates at least one of:

needing to verify the location request, information of a location service client that needs to verify the location request;

not needing to verify the location request, information of a location service client that does not need to verify the location request.

Optionally, the predetermined condition includes at least one of:

generating and/or updating the control information;

an acquiring request of acquiring the location of the user terminal is received;

a verifying request of acquiring the location of the user terminal is received;

a request of acquiring current control information is received; and a request of acquiring updated control information in the case that the current control information changes is received.

Optionally, the relevant behavior of acquiring the location of the user terminal includes at least one of:

whether to send to the user terminal a verifying request of acquiring the location of the user terminal;

whether to acquire the location of the user terminal;

whether to request a radio access network unit to trigger a location measurement for the user terminal;

whether to trigger the user terminal to perform a location measurement;

whether successfully responded to a received location request for the user terminal;

whether to disclose the acquired location of the user terminal; and whether requiring to start a timer.

Optionally, the sending module is configured to send the control information to a network unit, where the network unit includes at least one of: a radio access network node, a radio access network function, a core network function, a core network node, a mobile management node, a mobile management function, a location service management function, a location service management node, a location service management client, an evolved Node B (eNB), a next-generation base station (gNB), an Access and Mobility Management Function (AMF), a Mobile Management Entity (MME), a Location Service (LCS) function and an Enhanced Serving Mobile Location Centre (E-SMLC).

The base station provided by the embodiment of the present disclosure can implement various processes implemented by the user terminal in the method embodiments of FIG. 2 to FIG. 3. To avoid repetition, details are not described here, and transmission resources can be saved and the power consumption of the user terminal can also be reduced.

Figure 11:
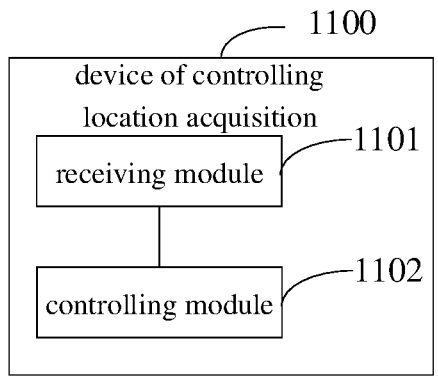
FIG. 11 is a structural diagram of a device of controlling a location acquisition in an embodiment of the present disclosure.

Referring to FIG. 11 which is a structural diagram of a device of controlling a location acquisition in an embodiment of the present disclosure. The device is applied to a network unit or a location service client. As shown in FIG. 11, the device 1100 includes:

a receiving module 1101, configured to receive control information configured to control a relevant behavior of acquiring a location of a user terminal;

a controlling module 1102, configured to control, based on or referring to the control information, the relevant behavior of acquiring the location of the user terminal.

Optionally, the control information indicates at least one of:

whether to permit to perform the relevant behavior of acquiring the location of the user terminal;

whether to permit a currently requested relevant behavior of acquiring the location of the user terminal;

whether to permit a subsequent relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; and a non-permission condition for not permitting to disclose the acquired location of the user terminal.

Optionally, the control information indicates permitting the relevant behavior of acquiring the location of the user terminal; and/or the control information indicates permitting the subsequent relevant behavior of acquiring the location of the user terminal; and/or the control information indicates a permission range where permitting the relevant behavior of acquiring the location of the user terminal; and/or the control information indicates a permission range where permitting the subsequent relevant behavior of acquiring the location of the user terminal;

the controlling module 1102 is configured to:

perform the relevant behavior of acquiring the location of the user terminal, based on or referring to the control information; and/or perform the subsequent relevant behavior of acquiring the location of the user terminal, based on or referring to the control information; and/or perform the relevant behavior of acquiring the location of the user terminal, based on or referring to the control information and within a permission range where permitting the relevant behavior of acquiring the location of the user terminal indicated by the control information; and/or perform the subsequent relevant behavior of acquiring the location of the user terminal, based on or referring to the control information and within a permission range where permitting the subsequent relevant behavior of acquiring the location of the user terminal indicated by the control information.

Optionally, the control information indicates not permitting to acquire the location of the user terminal; and/or the control information indicates a non-permission range where not permitting to acquire the location of the user terminal; and/or the control information indicates not permitting to acquire the location of the user terminal subsequently; and/or the control information indicates a non-permission range where not permitting to acquire the location of the user terminal subsequently;

the controlling module 1102 is configured to:

not permit to acquire the location of the user terminal, based on or referring to the control information; and/or not permit to acquire the location of the user terminal, based on or referring to the control information and within a non-permission range where not permitting to acquire the location of the user terminal indicated by the control information; and/or not permit to acquire the location of the user terminal subsequently, based on or referring to the control information; and/or not permit to acquire the location of the user terminal subsequently, based on or referring to the control information and within a non-permission range where not permitting to acquire the location of the user terminal subsequently indicated by the control information.

Optionally, the control information further indicates at least one of:

whether to permit to disclose the acquired location of the user terminal; and/or a permission range where permitting to disclose the acquired location of the user terminal; and/or a non-permission range where not permitting to disclose the acquired location of the user terminal, the controlling module 1102 is configured to:

disclose the acquired location of the user terminal, based on or referring to the control information; and/or disclose the acquired location of the user terminal, based on or referring to the control information and within the permission range where permitting to disclose the acquired location of the user terminal; and/or not permit to disclose the acquired location of the user terminal, based on or referring to the control information and within the non-permission range where not permitting to disclose the acquired location of the user terminal.

Optionally, the control information indicates the permission range by indicating a permission condition; and/or the control information indicates the permission range by indicating a non-permission condition, where a range that does not satisfy the non-permission condition belongs to the permission range; and/or the control information indicates the non-permission range by indicating a non-permission condition; and/or the control information indicates the non-permission range by indicating a permission condition, where a range that does not satisfy the non-permission condition belongs to the permission range.

Optionally, the permission condition includes at least one of: a permitted time period, a permitted time duration, permitted location service client information, permitted usage information, permitted terminal status information, permitted location type information, permitted moving area range information and permitted location measurement technical information; and/or the non-permission condition includes at least one of: a non-permitted time period, a non-permitted time duration, non-permitted location service client information, non-permitted usage information, non-permitted terminal status information, non-permitted location type information, non-permitted moving area range information and non-permitted location measurement technical information.

Optionally, the location service client information includes at least one of:

an identity of the location service client, a name of the identity of the location service client, a domain name address of the identity of the location service client, an identity of a requester of a location service client party, a name of the requester of the location service client party, an IP address of the requester of the location service client party, a type of a location request of the location service client and a port number applied by a location service client end; and/or the usage information includes at least one of an emergency business use and a commercial use; and/or the terminal status information includes at least one of: an idle state, a connected state, an inactive state, available or unavailable before a location measurement and when powering on and off; and/or the location type information includes at least one of: a current location, a historical location and a latest location; and/or the moving area range information includes at least one of: a Tracking Area (TA) identity list, a radio access network node identity list, a mobile management unit list, an Authentication Management Function (AMF) identity list, a Mobile Management Entity (MME) identity list, a location area list, a cell list of a service area list; and/or the location measurement technical information includes at least one of: an Enhanced Cell-ID (ECID) measurement, an Observed Time Difference of Arrival (OTDOA) measurement and an Uplink Time Difference of Arrival (UT-DOA) measurement.

Optionally, the control information indicates whether it is needed to request the user terminal to perform a permission verification on a location request in the case that the location of the user terminal needs to be acquired;

the controlling module is configured to: determine whether it is needed to request the user terminal to perform a permission verification on a location request, based on or referring to the control information, in the case that the location of the user terminal needs to be acquired.

Optionally, the control information indicates at least one of:

needing to verify the location request, information of a location service client that needs to verify the location request;

not needing to verify the location request, information of a location service client that does not need to verify the location request.

Figure 12:
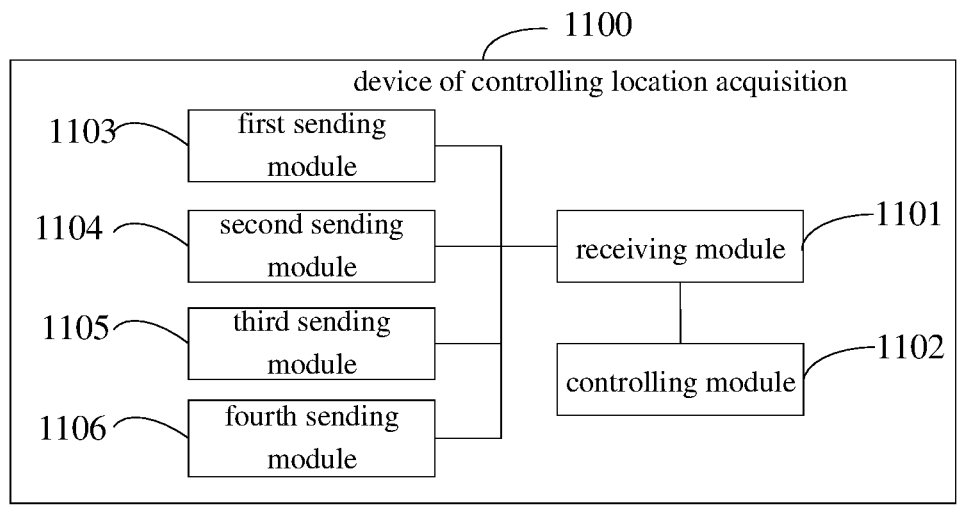
FIG. 12 is a structural diagram of a device of controlling a location acquisition in another embodiment of the present disclosure.

Optionally, as shown in FIG. 12, the device 1100 further includes at least one of:

a first sending module 1103, configured to send an acquiring request of acquiring the location of the user terminal;

a second sending module 1104, configured to send a verifying request of acquiring the location of the user terminal;

a third sending module 1105, configured to send a request of acquiring current control information; and a fourth sending module 1106, configured to send a request of acquiring updated control information.

Optionally, the controlling the relevant behavior of acquiring the location of the user terminal includes at least one of:

permitting the relevant behavior of acquiring the location of the user terminal;

not permitting the relevant behavior of acquiring the location of the user terminal;

starting a timer.

Optionally, the controlling module 1102 is configured to:

start a timer to perform a time counting in the case that control information indicates not permitting a subsequent relevant behavior of acquiring the location of the user terminal, and perform the subsequent not permitting the relevant behavior of acquiring the location of the user terminal after the timer starts to perform the time counting and before the timer expires;

where the time counting duration is preset or set according to a non-permitted time duration indicated by the control information;

and/or start a timer to perform a time counting in the case that control information indicates not permitting the relevant behavior of acquiring the location of the user terminal, and perform not permitting the relevant behavior of acquiring the location of the user terminal before the timer expires;

where the time counting duration is preset or set according to a non-permitted time duration indicated by the control information;

and/or start a timer to perform a time counting in the case that that control information indicates permitting the relevant behavior of acquiring the location of the user terminal and the control information indicates a permitted time, and permit the relevant behavior of acquiring the location of the user terminal before the timer expires.

Optionally, the performing not permitting the relevant behavior of acquiring the location of the user terminal includes at least one of:

directly feeding back a user terminal location acquisition failure, in the case that a location request for the user terminal is received;

not sending a verifying request of acquiring the location of the user terminal to the user terminal;

not acquiring the location of the user terminal;

not requesting a radio access network unit to trigger a location measurement for the user terminal;

not triggering the user terminal to perform a location measurement; and not responding to a location acquiring request sent by a location service client.

Optionally, the performing permitting the relevant behavior of acquiring the location of the user terminal includes at least one of:

sending a verifying request of acquiring the location of the user terminal to the user terminal;

acquiring the location of the user terminal;

requesting a radio access network unit to trigger a location measurement for the user terminal;

triggering the user terminal to perform a location measurement;

responding to a location acquiring request sent by a location service client, to acquire the location of the user terminal; and responding to a received location request for the user terminal, to acquire the location of the user terminal.

Figure 13:
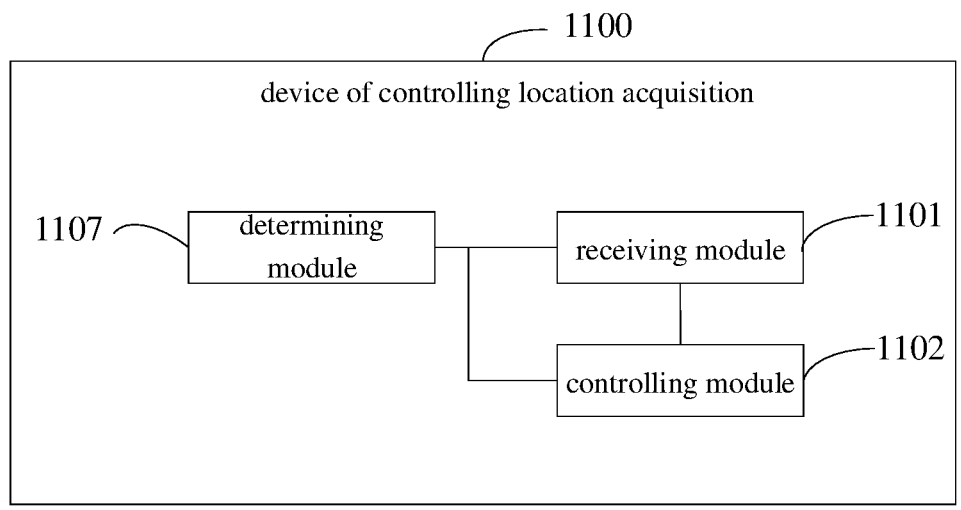
FIG. 13 is a structural diagram of a device of controlling a location acquisition in another embodiment of the present disclosure.

Optionally, as shown in FIG. 13, the device 1100 further includes:

a determining module 1107, configured to determine whether to receive the control information and returning back to the user terminal a return message of whether to determine to receive the control information and/or the received control information;

the controlling module 1102 is configured to control the relevant behavior of acquiring the location of the user terminal, based on or referring to the control information, in the case that the control information is received.

Optionally, the network unit includes at least one of: a radio access network node, a radio access network function, a core network function, a core network node, a mobile management node, a mobile management function, a location service management function, a location service management node, a location service management client, an evolved Node B (eNB), an Access and Mobility Management Function (AMF), a Mobile Management Entity (MME), a Location Service (LCS) function and an Enhanced Serving Mobile Location Centre (E-SMLC).

The base station provided by the embodiment of the present disclosure can implement various processes implemented by the network unit in the method embodiment of FIG. 4. In order to avoid repetition, details thereof are omitted herein. According to the base station in the embodiment of the present disclosure, it is able to save the transmission resource and reduce the power consumption of user terminal.

Figure 14:
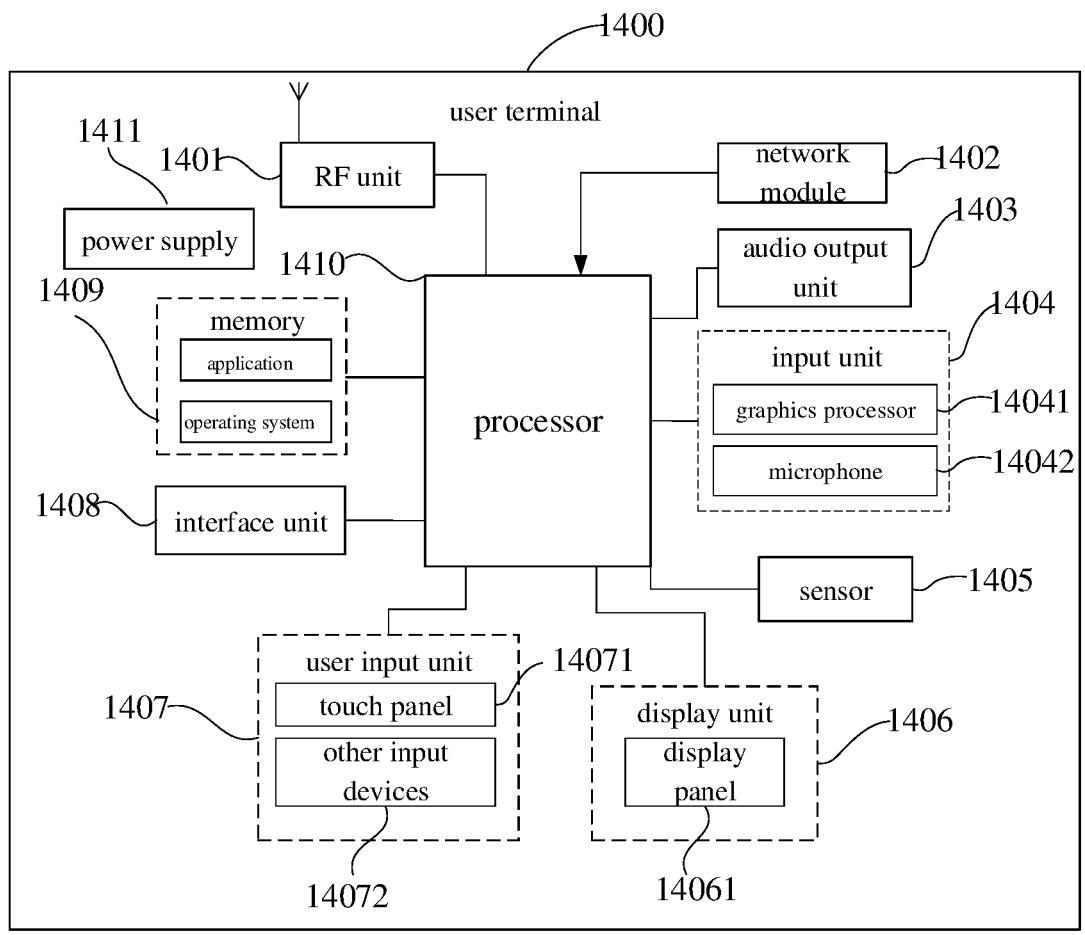
FIG. 14 is a structural diagram of a user terminal in another embodiment of the present disclosure.

FIG. 14 is a structural diagram of a user terminal in another embodiment of the present disclosure.

The user terminal 1400 includes but is not limited to: a radio frequency unit 1401, a network module 1402, an audio output unit 1403, an input unit 1404, a sensor 1405, a display unit 1406, a user input unit 1407, an interface unit 1408, a memory 1409, a processor 1410, and power supply 1411 and other components. Those skilled in the art may understand that the structure of the user terminal shown in FIG. 14 does not constitute a limitation on the user terminal, and the user terminal may include more or fewer components than those illustrated, or combine certain components, or different components layout. In the embodiments of the present disclosure, user terminals include but are not limited to mobile phones, tablet computers, notebook computers, palmtop computers, in-vehicle user terminals, wearable devices, and pedometers.

The processor 1410 is configured to determine whether the predetermined condition is satisfied;

The radio frequency unit 1401 is configured to send control information when it is determined that the predetermined condition is satisfied, and the control information is configured to control relevant behaviors of acquiring the location of the user terminal.

Optionally, the control information indicates at least one of:

whether to permit to perform the relevant behavior of acquiring the location of the user terminal;

whether to permit a currently requested relevant behavior of acquiring the location of the user terminal;

whether to permit a subsequent relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; and a non-permission condition for not permitting to disclose the acquired location of the user terminal.

Optionally, the control information indicates permitting the relevant behavior of acquiring the location of the user terminal; and/or the control information indicates permitting the subsequent relevant behavior of acquiring the location of the user terminal; and/or the control information indicates a permission range where permitting the relevant behavior of acquiring the location of the user terminal; and/or the control information indicates a permission range where permitting the subsequent relevant behavior of acquiring the location of the user terminal.

Optionally, the control information indicates not permitting to acquire the location of the user terminal; and/or the control information indicates a non-permission range where not permitting to acquire the location of the user terminal; and/or the control information indicates not permitting to acquire the location of the user terminal subsequently; and/or the control information indicates a non-permission range where not permitting to acquire the location of the user terminal subsequently.

Optionally, the control information further indicates at least one of:

whether to permit to disclose the acquired location of the user terminal; and/or a permission range where permitting to disclose the acquired location of the user terminal; and/or a non-permission range where not permitting to disclose the acquired location of the user terminal.

Optionally, the control information indicates the permission range by indicating a permission condition; and/or the control information indicates the permission range by indicating a non-permission condition, where a range that does not satisfy the non-permission condition belongs to the permission range; and/or the control information indicates the non-permission range by indicating a non-permission condition; and/or the control information indicates the non-permission range by indicating a permission condition, where a range that does not satisfy the non-permission condition belongs to the permission range.

Optionally, the permission condition includes at least one of: a permitted time period, a permitted time duration, permitted location service client information, permitted usage information, permitted terminal status information, permitted location type information, permitted moving area range information and permitted location measurement technical information; and/or the non-permission condition includes at least one of: a non-permitted time period, a non-permitted time duration, non-permitted location service client information, non-permitted usage information, non-permitted terminal status information, non-permitted location type information, non-permitted moving area range information and non-permitted location measurement technical information.

Optionally, the location service client information includes at least one of:

an identity of the location service client, a name of the identity of the location service client, a domain name address of the identity of the location service client, an identity of a requester of a location service client party, a name of the requester of the location service client party, an IP address of the requester of the location service client party, a type of a location request of the location service client and a port number applied by a location service client end; and/or the usage information includes at least one of an emergency business use and a commercial use; and/or the terminal status information includes at least one of: an idle state, a connected state, an inactive state, available or unavailable before a location measurement and when powering on and off; and/or the location type information includes at least one of: a current location, a historical location and a latest location; and/or the moving area range information includes at least one of: a Tracking Area (TA) identity list, a radio access network node identity list, a mobile management unit list, an Authentication Management Function (AMF) identity list, a Mobile Management Entity (MME) identity list, a location area list, a cell list of a service area list; and/or the location measurement technical information includes at least one of: an Enhanced Cell-ID (ECID) measurement, an Observed Time Difference of Arrival (OTDOA) measurement and an Uplink Time Difference of Arrival (UTDOA) measurement.

Optionally, the control information indicates whether it is needed to request the user terminal to perform a permission verification on a location request in the case that the location of the user terminal needs to be acquired.

Optionally, the control information indicates at least one of:

needing to verify the location request, information of a location service client that needs to verify the location request;

not needing to verify the location request, information of a location service client that does not need to verify the location request.

Optionally, the predetermined condition includes at least one of:

generating and/or updating the control information;

an acquiring request of acquiring the location of the user terminal (e.g., sent by the network unit or location service client) is received;

a verifying request of acquiring the location of the user terminal (e.g., sent by the network unit or location service client) is received;

a request of acquiring current control information (e.g., sent by the network unit or location service client) is received; and a request of acquiring updated control information in the case that the current control information changes (e.g., sent by the network unit or location service client) is received.

Optionally, the relevant behavior of acquiring the location of the user terminal includes at least one of:

whether to send to the user terminal a verifying request of acquiring the location of the user terminal;

whether to acquire the location of the user terminal;

whether to request a radio access network unit to trigger a location measurement for the user terminal;

whether to trigger the user terminal to perform a location measurement;

whether successfully responded to a received location request for the user terminal;

whether to disclose the acquired location of the user terminal; and whether requiring to start a timer.

Optionally, the sending the control information includes:

sending the control information to a network unit, where the network unit includes at least one of: a radio access network node, a radio access network function, a core network function, a core network node, a mobile management node, a mobile management function, a location service management function, a location service management node, a location service management client, an evolved Node B (eNB), a next-generation base station (gNB), an Access and Mobility Management Function (AMF), a Mobile Management Entity (MME), a Location Service (LCS) function and an Enhanced Serving Mobile Location Centre (E-SMLC).

It should be understood that, in the embodiment of the present disclosure, the radio frequency unit 1401 may be configured to receive and send signals during sending and receiving information or during a call. Specifically, after receiving the downlink data from the base station, it is processed by the processor 1410. The uplink data is sent to the base station. Generally, the radio frequency unit 1401 includes, but is not limited to, an antenna, at least one amplifier, a transceiver, a coupler, a low noise amplifier, a duplexer, and the like. In addition, the radio frequency unit 1401 can also communicate with the network and other devices through a wireless communication system.

The user terminal provides the user with wireless broadband Internet access through the network module 1402, such as helping the user to send and receive e-mail, browse the web, and access streaming media.

The audio output unit 1403 may convert the audio data received by the radio frequency unit 1401 or the network module 1402 or stored in the memory 1409 into an audio signal and output as sound. Moreover, the audio output unit 1403 may also provide audio output related to a specific function performed by the user terminal 1400 (for example, call signal reception sound, message reception sound, etc.). The audio output unit 1403 includes a speaker, a buzzer, a receiver, and so on.

The input unit 1404 is configured to receive audio or video signals. The input unit 1404 may include a graphics processing unit (Graphics Processing Unit, GPU) 14041 and a microphone 14042. The graphics processor 14041 displays images of still pictures or videos acquired by an image capture device (such as a camera) in a video capture mode or an image capture mode. The data is processed. The processed image frame may be displayed on the display unit 1406. The image frame processed by the graphics processor 14041 may be stored in the memory 1409 (or other storage medium) or sent via the radio frequency unit 1401 or the network module 1402. The microphone 14042 can receive sound, and can process such sound into audio data. The processed audio data can be converted into a format that can be sent to the mobile communication 1407 base station via the radio frequency unit 1401 in the case of the telephone call mode and output.

The user terminal 1400 further includes at least one sensor 1405, such as a light sensor, a motion sensor, and other sensors. Specifically, the light sensor includes an ambient light sensor and a proximity sensor, wherein the ambient light sensor can adjust the brightness of the display panel 14061 according to the brightness of the ambient light, and the proximity sensor can close the display panel 14061 and the user terminal 1400 when moving to the ear/Or backlight. As a type of motion sensor, the accelerometer sensor can detect the magnitude of acceleration in various directions (generally three axes), and can detect the magnitude and direction of gravity when at rest, and can be configured to identify the user terminal posture (such as horizontal and vertical screen switching, related games, Magnetometer attitude calibration), vibration recognition related functions (such as pedometer, tap), etc.; sensor 1405 can also include fingerprint sensors, pressure sensors, iris sensors, molecular sensors, gyroscopes, barometers, hygrometers, thermometers, Infrared sensors, etc. will not be repeated here.

The display unit 1406 is configured to display information input by the user or information provided to the user. The display unit 1406 may include a display panel 14061, and the display panel 14061 may be configured in the form of a liquid crystal display (LCD), organic light-emitting diode (OLED), or the like.

The user input unit 1407 can be configured to receive input numeric or character information, and generate key signal input related to user settings and function control of the user terminal. Specifically, the user input unit 1407 includes a touch panel 14071 and other input devices 14072. The touch panel 14071, also known as a touch screen, can collect user's touch operations on or near it (for example, the user uses any suitable objects or accessories such as fingers, stylus, etc. on or near the touch panel 14071. operating). The touch panel 14071 may include a touch detection device and a touch controller. Among them, the touch detection device detects the user's touch orientation, and detects the signal brought by the touch operation, and transmits the signal to the touch controller; the touch controller receives touch information from the touch detection device and converts it into contact coordinates, and then sends To the processor 1410, the command sent by the processor 1410 is received and executed. In addition, the touch panel 14071 can be implemented in various types such as resistive, capacitive, infrared, and surface acoustic waves. In addition to the touch panel 14071, the user input unit 1407 may also include other input devices 14072. Specifically, other input devices 14072 may include, but are not limited to, physical keyboards, function keys (such as volume control keys, switch keys, etc.), trackballs, mice, and joysticks, which will not be repeated here.

Further, the touch panel 14071 can be overlaid on the display panel 14061. After the touch panel 14071 detects a touch operation on or near it, it is transmitted to the processor 1410 to determine the type of touch event, and the processor 1410 then provides corresponding visual output on the display panel 14061. Although in FIG. 14, the touch panel 14071 and the display panel 14061 are implemented as two independent components to realize the input and output functions of the user terminal, in some embodiments, the touch panel 14071 and the display panel 14061 may be integrated The input and output functions of the user terminal are not specifically limited here.

The interface unit 1408 is an interface for connecting an external device to the user terminal 1400. For example, the external device may include a wired or wireless headset port, an external power (or battery charger) port, a wired or wireless data port, a memory card port, a port for connecting a device with an identification module, audio input/output (I/O) port, video I/O port, headphone port, etc. The interface unit 1408 may be configured to receive input from external devices (e.g., data information, power, etc.) and transmit the received input to one or more elements within the user terminal 1400 or may be used at the user terminal 1400 and external Transfer data between devices.

The memory 1409 can be configured to store software programs and various data. The memory 1409 may mainly include a storage program area and a storage data area, wherein the storage program area may store an operating system, at least one function required application programs (such as sound playback function, image playback function, etc.), etc.; the storage data area may store Data created by the use of mobile phones (such as audio data, phonebooks, etc.), etc. In addition, the memory 1409 may include a high-speed random access memory, and may also include a non-volatile memory, such as at least one magnetic disk storage device, a flash memory device, or other volatile solid-state storage devices.

The processor 1410 is the control center of the user terminal, and uses various interfaces and lines to connect the various parts of the entire user terminal, by running or executing the software programs and/or modules stored in the memory 1409, and calling the data stored in the memory 1409, perform various functions and process data of the user terminal, so as to monitor the user terminal as a whole. The processor 1410 may include one or more processing units; preferably, the processor 1410 may integrate an application processor and a modem processor, where the application processor mainly processes an operating system, a user interface, and application programs, etc. The processor mainly handles wireless communication. It can be understood that, the foregoing modem processor may not be integrated into the processor 1410.

The user terminal 1400 may further include a power supply 1411 (such as a battery) that supplies power to various components. Preferably, the power supply 1411 may be logically connected to the processor 1410 through a power management system, thereby managing charge, discharge, and power consumption management through the power management system and other functions.

In addition, the user terminal 1400 includes some function modules not shown, which will not be repeated here.

Optionally, a user terminal is further provided in an embodiment of the present disclosure, including: a memory 1409, a processor 1410 and a computer program stored in the memory 1409 and executable on the processor 1410, where the computer program is executed by the processor to perform the method of controlling a location acquisition hereinabove, which can achieve the same technical effect, and in order to avoid repetition, they are not repeated here.

Figure 15:
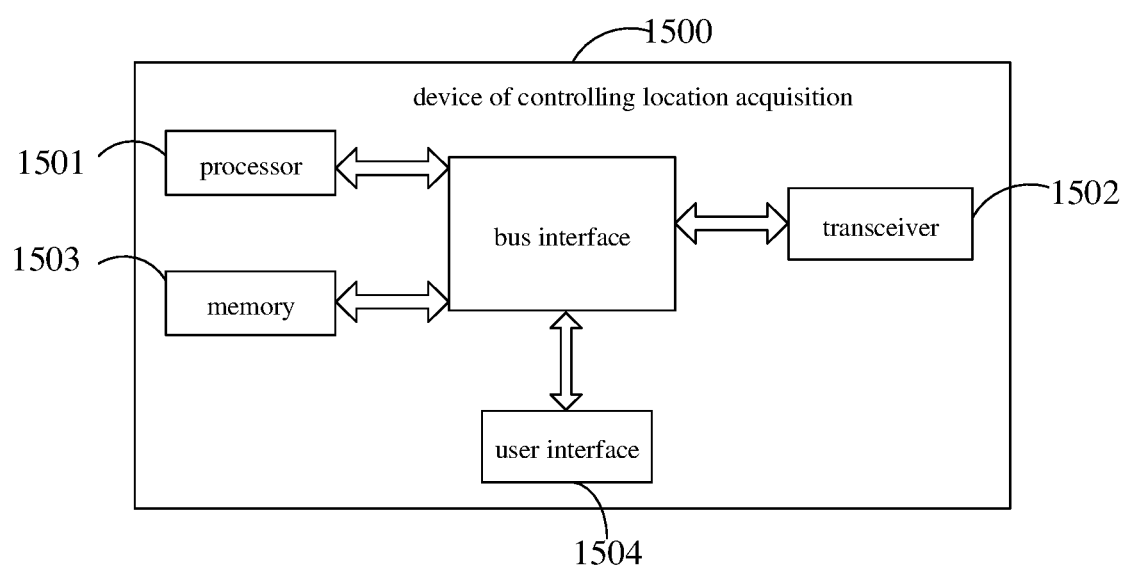
FIG. 15 is a structural diagram of a device of controlling a location acquisition in another embodiment of the present disclosure.

Referring to FIG. 15 which is a structural diagram of a device of controlling a location acquisition in another embodiment of the present disclosure. The device is applied to a network unit or a location service client. As shown in FIG. 15, the device 1500 of controlling location acquisition includes: a processor 1501, a transceiver 1502, a memory 1503 and a bus interface, where the transceiver 1502 is configured to receive control information configured to control relevant behaviors of acquiring the location of the user terminal;

the processor 1501 is configured to control the relevant behaviors of acquiring the location of the user terminal according to or referring to the control information.

Optionally, the control information indicates at least one of:

whether to permit to perform the relevant behavior of acquiring the location of the user terminal;

whether to permit a currently requested relevant behavior of acquiring the location of the user terminal;

whether to permit a subsequent relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; and a non-permission condition for not permitting to disclose the acquired location of the user terminal.

Optionally, the control information indicates permitting the relevant behavior of acquiring the location of the user terminal; and/or the control information indicates permitting the subsequent relevant behavior of acquiring the location of the user terminal; and/or the control information indicates a permission range where permitting the relevant behavior of acquiring the location of the user terminal; and/or the control information indicates a permission range where permitting the subsequent relevant behavior of acquiring the location of the user terminal;

the controlling module is configured to:

perform the relevant behavior of acquiring the location of the user terminal, based on or referring to the control information; and/or perform the subsequent relevant behavior of acquiring the location of the user terminal, based on or referring to the control information; and/or perform the relevant behavior of acquiring the location of the user terminal, based on or referring to the control information and within a permission range where permitting the relevant behavior of acquiring the location of the user terminal indicated by the control information; and/or perform the subsequent relevant behavior of acquiring the location of the user terminal, based on or referring to the control information and within a permission range where permitting the subsequent relevant behavior of acquiring the location of the user terminal indicated by the control information.

Optionally, the control information indicates not permitting to acquire the location of the user terminal; and/or the control information indicates a non-permission range where not permitting to acquire the location of the user terminal; and/or the control information indicates not permitting to acquire the location of the user terminal subsequently; and/or the control information indicates a non-permission range where not permitting to acquire the location of the user terminal subsequently;

the controlling module is configured to:

not permit to acquire the location of the user terminal, based on or referring to the control information; and/or not permit to acquire the location of the user terminal, based on or referring to the control information and within a non-permission range where not permitting to acquire the location of the user terminal indicated by the control information; and/or not permit to acquire the location of the user terminal subsequently, based on or referring to the control information; and/or not permit to acquire the location of the user terminal subsequently, based on or referring to the control information and within a non-permission range where not permitting to acquire the location of the user terminal subsequently indicated by the control information.

Optionally, the control information further indicates at least one of:

whether to permit to disclose the acquired location of the user terminal; and/or a permission range where permitting to disclose the acquired location of the user terminal; and/or a non-permission range where not permitting to disclose the acquired location of the user terminal, the controlling module is configured to:

disclose the acquired location of the user terminal, based on or referring to the control information; and/or disclose the acquired location of the user terminal, based on or referring to the control information and within the permission range where permitting to disclose the acquired location of the user terminal; and/or not permit to disclose the acquired location of the user terminal, based on or referring to the control information and within the non-permission range where not permitting to disclose the acquired location of the user terminal.

Optionally, the control information indicates the permission range by indicating a permission condition; and/or the control information indicates the permission range by indicating a non-permission condition, where a range that does not satisfy the non-permission condition belongs to the permission range; and/or the control information indicates the non-permission range by indicating a non-permission condition; and/or the control information indicates the non-permission range by indicating a permission condition, where a range that does not satisfy the non-permission condition belongs to the permission range.

Optionally, the permission condition includes at least one of: a permitted time period, a permitted time duration, permitted location service client information, permitted usage information, permitted terminal status information, permitted location type information, permitted moving area range information and permitted location measurement technical information; and/or the non-permission condition includes at least one of: a non-permitted time period, a non-permitted time duration, non-permitted location service client information, non-permitted usage information, non-permitted terminal status information, non-permitted location type information, non-permitted moving area range information and non-permitted location measurement technical information.

Optionally, the location service client information includes at least one of:

an identity of the location service client, a name of the identity of the location service client, a domain name address of the identity of the location service client, an identity of a requester of a location service client party, a name of the requester of the location service client party, an IP address of the requester of the location service client party, a type of a location request of the location service client and a port number applied by a location service client end; and/or the usage information includes at least one of an emergency business use and a commercial use; and/or the terminal status information includes at least one of: an idle state, a connected state, an inactive state, available or unavailable before a location measurement and when powering on and off; and/or the location type information includes at least one of: a current location, a historical location and a latest location; and/or the moving area range information includes at least one of: a Tracking Area (TA) identity list, a radio access network node identity list, a mobile management unit list, an Authentication Management Function (AMF) identity list, a Mobile Management Entity (MME) identity list, a location area list, a cell list of a service area list; and/or the location measurement technical information includes at least one of: an Enhanced Cell-ID (ECID) measurement, an Observed Time Difference of Arrival (OTDOA) measurement and an Uplink Time Difference of Arrival (UT-DOA) measurement.

Optionally, the control information indicates whether it is needed to request the user terminal to perform a permission verification on a location request in the case that the location of the user terminal needs to be acquired;

the controlling module is configured to: determine whether it is needed to request the user terminal to perform a permission verification on a location request, based on or referring to the control information, in the case that the location of the user terminal needs to be acquired.

Optionally, the control information indicates at least one of:

needing to verify the location request, information of a location service client that needs to verify the location request;

not needing to verify the location request, information of a location service client that does not need to verify the location request.

Optionally, before receiving the control information, the transceiver 1502 is further configured to perform at least one of:

send an acquiring request of acquiring the location of the user terminal;

send a verifying request of acquiring the location of the user terminal;

send a request of acquiring current control information; and send a request of acquiring updated control information.

Optionally, the controlling the relevant behavior of acquiring the location of the user terminal includes at least one of:

permitting the relevant behavior of acquiring the location of the user terminal;

not permitting the relevant behavior of acquiring the location of the user terminal;

starting a timer.

Optionally, the controlling module is configured to:

start a timer to perform a time counting in the case that control information indicates not permitting a subsequent relevant behavior of acquiring the location of the user terminal, and perform the subsequent not permitting the relevant behavior of acquiring the location of the user terminal after the timer starts to perform the time counting and before the timer expires;

where the time counting duration is preset or set according to a non-permitted time duration indicated by the control information;

and/or start a timer to perform a time counting in the case that control information indicates not permitting the relevant behavior of acquiring the location of the user terminal, and perform not permitting the relevant behavior of acquiring the location of the user terminal before the timer expires;

where the time counting duration is preset or set according to a non-permitted time duration indicated by the control information;

and/or start a timer to perform a time counting in the case that that control information indicates permitting the relevant behavior of acquiring the location of the user terminal and the control information indicates a permitted time, and permit the relevant behavior of acquiring the location of the user terminal before the timer expires.

Optionally, the performing not permitting the relevant behavior of acquiring the location of the user terminal includes at least one of:

directly feeding back a user terminal location acquisition failure, in the case that a location request for the user terminal is received;

not sending a verifying request of acquiring the location of the user terminal to the user terminal;

not acquiring the location of the user terminal;

not requesting a radio access network unit to trigger a location measurement for the user terminal;

not triggering the user terminal to perform a location measurement; and not responding to a location acquiring request sent by a location service client.

Optionally, the performing permitting the relevant behavior of acquiring the location of the user terminal includes at least one of:

sending a verifying request of acquiring the location of the user terminal to the user terminal;

acquiring the location of the user terminal;

requesting a radio access network unit to trigger a location measurement for the user terminal;

triggering the user terminal to perform a location measurement;

responding to a location acquiring request sent by a location service client, to acquire the location of the user terminal; and responding to a received location request for the user terminal, to acquire the location of the user terminal.

Optionally, after receiving the control information, the transceiver 1502 is further configured to determine whether to receive the control information and returning back to the user terminal a return message of whether to determine to receive the control information and/or the received control information;

the controlling, based on or referring to the control information, the relevant behavior of acquiring the location of the user terminal includes: control the relevant behavior of acquiring the location of the user terminal, based on or referring to the control information, in the case that the control information is received.

Optionally, the network unit includes at least one of: a radio access network node, a radio access network function, a core network function, a core network node, a mobile management node, a mobile management function, a location service management function, a location service management node, a location service management client, an evolved Node B (eNB), an Access and Mobility Management Function (AMF), a Mobile Management Entity (MME), a Location Service (LCS) function and an Enhanced Serving Mobile Location Centre (E-SMLC).

The transceiver 1502 is configured to receive and transmit data under the control of the processor 1501, and the transceiver 1502 includes at least two antenna ports.

In FIG. 15, the bus architecture may include any number of interconnected buses and bridges, specifically, one or more processors represented by the processor 1501 and various circuits of the memory represented by the memory 1503 are linked together. The bus architecture can also link various other circuits such as peripheral devices, voltage regulators, and power management circuits, etc., which are well known in the art, and therefore, they will not be further described in this article. The bus interface provides an interface. The transceiver 1502 may be a plurality of elements, including a transmitter and a receiver, and provides a unit for communicating with various other devices on a transmission medium. For different user devices, the user interface 1504 may also be an interface that can be externally connected to the required device. The connected devices include, but are not limited to, a keypad, a display, a speaker, a microphone, and a joystick.

The processor 1501 is responsible for managing the bus architecture and general processing, and the memory 1503 may store data used by the processor 1501 when performing operations.

Optionally, a device of controlling a location acquisition is further provided in an embodiment, including: a memory 1503, a processor 1501 and a computer program stored in the memory 1503 and executable on the processor 1501, where the computer program is executed by the processor 1501 to perform the method of controlling a location acquisition hereinabove, and the same technical effect can be achieved. To avoid repetition, details are not repeated here.

A computer-readable storage medium storing a computer program is further provided in an embodiment of the present disclosure, where the computer program is executed by a processor to perform the method of controlling a location acquisition at the user terminal side in the embodiment of the present disclosure.

A computer-readable storage medium storing a computer program is further provided in an embodiment of the present disclosure, where the computer program is executed by a processor to perform the method of controlling a location acquisition at the device of controlling a location acquisition side in the embodiment of the present disclosure.

The computer-readable storage medium, such as Read-Only Memory (ROM), a Random Access Memory (RAM), magnetic disk or optical disk, etc.

It should be noted that in this article, the terms "include", "including" or any other variant thereof are intended to cover non-exclusive inclusion, so that a process, method, article or device that includes a series of elements includes not only those elements, It also includes other elements that are not explicitly listed, or include elements inherent to this process, method, article, or device. Without more restrictions, the element defined by the sentence "include one . . . " does not exclude that there are other identical elements in the process, method, article or device that includes the element.

Through the description of the above embodiments, those skilled in the art can clearly understand that the methods in the above embodiments can be implemented by means of software plus a necessary general hardware platform, and of course, can also be implemented by hardware, but in many cases the former is better implementation. Based on this understanding, the technical solution of the present disclosure can be embodied in the form of a software product in essence or part that contributes to the existing technology, and the computer software product is stored in a storage medium (such as ROM/RAM, magnetic disk, The CD-ROM includes several instructions to enable a terminal (which may be a mobile phone, a computer, a server, an air conditioner, or a network device, etc.) to execute the method described in each embodiment of the present disclosure.

The embodiments of the present disclosure have been described above with reference to the drawings, but the present disclosure is not limited to the above-mentioned specific embodiments. The above-mentioned specific embodiments are only schematic, not limiting, and those of ordinary skill in the art under the enlightenment of the present disclosure, many forms can be made without departing from the principle of the present disclosure and the scope of the claims, all of which fall within the scope of the present disclosure.

What is claimed is:

1. A device of controlling a location acquisition, comprising: a memory, a processor and a computer program stored in the memory and executable on the processor, wherein when the computer program is executed by the processor, cause the device to perform the following:

receiving control information configured to indicate whether to permit a subsequent relevant behavior of acquiring a location of the user terminal;

controlling, based on or referring to the control information, the relevant behavior of acquiring the location of the user terminal;

in a case that the control information indicates that the subsequent relevant behavior of acquiring the location of the user terminal is not permitted, the controlling the relevant behavior of acquiring the location of the user terminal comprises at least one of:

directly feeding back a user terminal location acquisition failure, in the case that a location request for the user terminal is received;

not sending a verifying request of acquiring the location of the user terminal to the user terminal;

not acquiring the location of the user terminal;

not requesting a radio access network unit to trigger a location measurement for the user terminal;

not triggering the user terminal to perform a location measurement;

not responding to a location acquiring request sent by a location service client; or, rejecting a location service request from a location service client regarding a user equipment, UE.

2. The device according to claim 1, wherein the control information indicates at least one of:

whether to permit to perform the relevant behavior of acquiring the location of the user terminal;

whether to permit a currently requested relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; or, a non-permission condition for not permitting to disclose the acquired location of the user terminal.

3. The device according to claim 2, wherein the control information indicates not permitting to acquire the location of the user terminal; and/or the control information indicates a non-permission range where not permitting to acquire the location of the user terminal; and/or the control information indicates not permitting to acquire the location of the user terminal subsequently; and/or the control information indicates a non-permission range where not permitting to acquire the location of the user terminal subsequently;

the controlling, based on or referring to the control information, the relevant behavior of acquiring the location of the user terminal comprises:

not permitting to acquire the location of the user terminal, based on or referring to the control information; and/or not permitting to acquire the location of the user terminal, based on or referring to the control information and within a non-permission range where not permitting to acquire the location of the user terminal indicated by the control information; and/or not permitting to acquire the location of the user terminal subsequently, based on or referring to the control information; and/or not permitting to acquire the location of the user terminal subsequently, based on or referring to the control information and within a non-permission range where not permitting to acquire the location of the user terminal subsequently indicated by the control information.

4. The device according to claim 2, wherein the control information further indicates at least one of:

whether to permit to disclose the acquired location of the user terminal;

a permission range where permitting to disclose the acquired location of the user terminal; or, a non-permission range where not permitting to disclose the acquired location of the user terminal, the controlling, based on or referring to the control information, the relevant behavior of acquiring the location of the user terminal comprises:

disclosing the acquired location of the user terminal, based on or referring to the control information; and/or disclosing the acquired location of the user terminal, based on or referring to the control information and within the permission range where permitting to disclose the acquired location of the user terminal; and/or not permitting to disclose the acquired location of the user terminal, based on or referring to the control information and within the non-permission range where not permitting to disclose the acquired location of the user terminal.

5. The device according to claim 1, wherein the control information indicates the permission range by indicating a permission condition; and/or the control information indicates the permission range by indicating a non-permission condition, wherein a range that does not satisfy the non-permission condition belongs to the permission range; and/or the control information indicates the non-permission range by indicating a non-permission condition; and/or the control information indicates the non-permission range by indicating a permission condition, wherein a range that does not satisfy the non-permission condition belongs to the permission range.

6. The device according to claim 2, wherein the permission condition comprises at least one of: a permitted time period, a permitted time duration, permitted location service client information, permitted usage information, permitted terminal status information, permitted location type information, permitted moving area range information or permitted location measurement technical information; and/or the non-permission condition comprises at least one of: a non-permitted time period, a non-permitted time duration, non-permitted location service client information, non-permitted usage information, non-permitted terminal status information, non-permitted location type information, non-permitted moving area range information or non-permitted location measurement technical information.

7. The device according to claim 1, wherein the control information indicates whether it is needed to request the user terminal to perform a permission verification on a location request in the case that the location of the user terminal needs to be acquired;

the controlling, based on or referring to the control information, the relevant behavior of acquiring the location of the user terminal comprises:

determining whether it is needed to request the user terminal to perform a permission verification on a location request, based on or referring to the control information, in the case that the location of the user terminal needs to be acquired.

8. The device according to claim 1, wherein the controlling, based on or referring to the control information, the relevant behavior of acquiring the location of the user terminal comprises:
   starting a timer to perform a time counting in the case that control information indicates not permitting a subsequent relevant behavior of acquiring the location of the user terminal, and
   performing the subsequent not permitting the relevant behavior of acquiring the location of the user terminal after the timer starts to perform the time counting and before the timer expires;
   wherein the time counting duration is preset or set according to a non-permitted time duration indicated by the control information;
   and/or
   starting a timer to perform a time counting in the case that control information indicates not permitting the relevant behavior of acquiring the location of the user terminal, and
   performing not permitting the relevant behavior of acquiring the location of the user terminal before the timer expires;
   wherein the time counting duration is preset or set according to a non-permitted time duration indicated by the control information;
   and/or
   starting a timer to perform a time counting in the case that that control information indicates permitting the relevant behavior of acquiring the location of the user terminal and the control information indicates a permitted time, and permitting the relevant behavior of acquiring the location of the user terminal before the timer expires.

9. The device according to claim 1, wherein the performing permitting the relevant behavior of acquiring the location of the user terminal comprises at least one of:
   sending a verifying request of acquiring the location of the user terminal to the user terminal;
   acquiring the location of the user terminal;
   requesting a radio access network unit to trigger a location measurement for the user terminal;
   triggering the user terminal to perform a location measurement;
   responding to a location acquiring request sent by a location service client, to acquire the location of the user terminal; or,
   responding to a received location request for the user terminal, to acquire the location of the user terminal.

10. The device according to claim 1, wherein the network unit comprises at least one of: a radio access network node, a radio access network function, a core network function, a core network node, a mobile management node, a mobile management function, a location service management function, a location service management node, a location service management client, an evolved Node B (eNB), an Access and Mobility Management Function (AMF), a Mobile Management Entity (MME), a Location Service (LCS) function or an Enhanced Serving Mobile Location Centre (E-SMLC).

11. A non-transitory computer-readable storage medium storing a computer program, wherein when the computer program is executed by a processor, cause an apparatus including the processor to perform the following:
   determining whether a predetermined condition is satisfied;
   in the case that the predetermined condition is satisfied, sending control information configured to indicate whether to permit a subsequent relevant behavior of acquiring a location of the user terminal;
   the predetermined condition comprises at least one of:
   generating and/or updating the control information;
   an acquiring request of acquiring the location of the user terminal is received;
   a verifying request of acquiring the location of the user terminal is received;
   a request of acquiring current control information is received; or,
   a request of acquiring updated control information in the case that the current control information changes is received.

12. The non-transitory computer-readable storage medium storing a computer program according to claim 11, wherein the control information indicates at least one of:
   whether to permit to perform the relevant behavior of acquiring the location of the user terminal;
   whether to permit a currently requested relevant behavior of acquiring the location of the user terminal;
   a permission condition for permitting to perform the relevant behavior of acquiring the location of the user terminal;
   a non-permission condition for not permitting to perform the relevant behavior of acquiring the location of the user terminal;
   a permission condition for permitting the subsequent relevant behavior of acquiring the location of the user terminal;
   a non-permission condition for not permitting the subsequent relevant behavior of acquiring the location of the user terminal;
   whether to permit to disclose the acquired location of the user terminal;
   a permission condition for permitting to disclose the acquired location of the user terminal; or,
   a non-permission condition for not permitting to disclose the acquired location of the user terminal.

13. The non-transitory computer-readable storage medium storing a computer program according to claim 12, wherein
   the permission condition comprises at least one of: a permitted time period, a permitted time duration, permitted location service client information, permitted usage information, permitted terminal status information, permitted location type information, permitted moving area range information or permitted location measurement technical information; and/or
   the non-permission condition comprises at least one of: a non-permitted time period, a non-permitted time duration, non-permitted location service client information, non-permitted usage information, non-permitted terminal status information, non-permitted location type information, non-permitted moving area range information or non-permitted location measurement technical information.

14. The non-transitory computer-readable storage medium storing a computer program according to claim 11, wherein the control information indicates whether it is needed to request the user terminal to perform a permission verification on a location request in the case that the location of the user terminal needs to be acquired.

15. The non-transitory computer-readable storage medium storing a computer program according to claim 12, wherein the relevant behavior of acquiring the location of the user terminal comprises at least one of:

whether to send to the user terminal a verifying request of acquiring the location of the user terminal;

whether to acquire the location of the user terminal;

whether to request a radio access network unit to trigger a location measurement for the user terminal;

whether to trigger the user terminal to perform 6 location measurement;

whether successfully responded to a received location request for the user terminal;

whether to disclose the acquired location of the user terminal; or, whether requiring to start a timer.

16. A non-transitory computer-readable storage medium storing a computer program, wherein when the computer program is executed by a processor, cause an apparatus including the processor to perform the following:

receiving control information configured to indicate whether to permit a subsequent relevant behavior of acquiring a location of the user terminal;

controlling, based on or referring to the control information, the relevant behavior of acquiring the location of the user terminal;

in a case that the control information indicates that the subsequent relevant behavior of acquiring the location of the user terminal is not permitted, the controlling the relevant behavior of acquiring the location of the user terminal comprises at least one of:

directly feeding back a user terminal location acquisition failure, in the case that a location request for the user terminal is received;

not sending a verifying request of acquiring the location of the user terminal to the user terminal;

not acquiring the location of the user terminal;

not requesting a radio access network unit to trigger a location measurement for the user terminal;

not triggering the user terminal to perform a location measurement;

not responding to a location acquiring request sent by a location service client; or, rejecting a location service request from a location service client regarding a user equipment, UE.

17. The non-transitory computer-readable storage medium storing a computer program according to claim 16, wherein the control information indicates at least one of:

whether to permit to perform the relevant behavior of acquiring the location of the user terminal;

whether to permit a currently requested relevant behavior of acquiring the location of the user terminal;

a permission condition for permitting to perform the relevant behavior of acquiring the location of the user terminal;

a non-permission condition for not permitting to perform the relevant behavior of acquiring the location of the user terminal;

a permission condition for permitting the subsequent relevant behavior of acquiring the location of the user terminal;

a non-permission condition for not permitting the subsequent relevant behavior of acquiring the location of the user terminal;

whether to permit to disclose the acquired location of the user terminal;

a permission condition for permitting to disclose the acquired location of the user terminal; or, a non-permission condition for not permitting to disclose the acquired location of the user terminal.

18. The non-transitory computer-readable storage medium storing a computer program according to claim 17, wherein the permission condition comprises at least one of: a permitted time period, a permitted time duration, permitted location service client information, permitted usage information, permitted terminal status information, permitted location type information, permitted moving area range information or permitted location measurement technical information; and/or the non-permission condition comprises at least one of: a non-permitted time period, a non-permitted time duration, non-permitted location service client information, non-permitted usage information, non-permitted terminal status information, non-permitted location type information, non-permitted moving area range information or non-permitted location measurement technical information.

19. The non-transitory computer-readable storage medium storing a computer program according to claim 16, wherein the control information indicates whether it is needed to request the user terminal to perform a permission verification on a location request in the case that the location of the user terminal needs to be acquired;

the controlling, based on or referring to the control information, the relevant behavior of acquiring the location of the user terminal comprises:

determining whether it is needed to request the user terminal to perform a permission verification on a location request, based on or referring to the control information, in the case that the location of the user terminal needs to be acquired.

20. The non-transitory computer-readable storage medium storing a computer program according to claim 16, the controlling, based on or referring to the control information, the relevant behavior of acquiring the location of the user terminal comprises:

starting a timer to perform a time counting in the case that control information indicates not permitting a subsequent relevant behavior of acquiring the location of the user terminal, and performing the subsequent not permitting the relevant behavior of acquiring the location of the user terminal after the timer starts to perform the time counting and before the timer expires;

wherein the time counting duration is preset or set according to a non-permitted time duration indicated by the control information;

and/or starting a timer to perform a time counting in the case that control information indicates not permitting the relevant behavior of acquiring the location of the user terminal, and performing not permitting the relevant behavior of acquiring the location of the user terminal before the timer expires;

wherein the time counting duration is preset or set according to a non-permitted time duration indicated by the control information;

and/or starting a timer to perform a time counting in the case that that control information indicates permitting the relevant behavior of acquiring the location of the user terminal and the control information indicates a permitted time, and permitting the relevant behavior of acquiring the location of the user terminal before the timer expires.

\* \* \* \* \*